United States Patent
Wanda

(10) Patent No.: US 7,362,456 B2
(45) Date of Patent: Apr. 22, 2008

(54) PRINT JOB SUBSTITUTION IN A COPY JOB

(75) Inventor: Koichiro Wanda, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 969 days.

(21) Appl. No.: 10/632,972

(22) Filed: Aug. 4, 2003

(65) Prior Publication Data

US 2004/0021903 A1 Feb. 5, 2004

(30) Foreign Application Priority Data

Aug. 5, 2002 (JP) ............................. 2002-228021
Jul. 8, 2003 (JP) ............................. 2003-193635

(51) Int. Cl.
*G06K 15/00* (2006.01)

(52) U.S. Cl. ..................... 358/1.14; 358/1.16; 358/1.18

(58) Field of Classification Search ............... 358/1.15, 358/1.14, 1.16, 1.18; 710/15, 17, 54; 399/8, 399/24; 709/203, 219; 714/2

See application file for complete search history.

(56) References Cited

U.S. PATENT DOCUMENTS

| | | | |
|---|---|---|---|
| 5,845,057 A * | 12/1998 | Takeda et al. ............. | 358/1.15 |
| 6,115,132 A | 9/2000 | Nakatsuma et al. ....... | 358/1.14 |
| 6,474,881 B1 | 11/2002 | Wanda ........................ | 400/61 |
| 6,552,813 B2 * | 4/2003 | Yacoub ...................... | 358/1.1 |
| 7,221,465 B1 * | 5/2007 | Shimada .................... | 358/1.14 |
| 2001/0052995 A1 * | 12/2001 | Idehara ...................... | 358/1.15 |
| 2002/0131069 A1 | 9/2002 | Wanda ....................... | 358/1.14 |
| 2003/0076524 A1 | 4/2003 | Wanda ....................... | 358/1.14 |

FOREIGN PATENT DOCUMENTS

| | | | |
|---|---|---|---|
| JP | 5-241746 | | 9/1993 |
| JP | 07225660 A | * | 8/1995 |
| JP | 9-081338 | | 3/1997 |
| JP | 09081338 A | * | 3/1997 |
| JP | 10-011242 | | 1/1998 |
| JP | 10-240480 | | 9/1998 |
| JP | 2000-259378 | | 9/2000 |
| JP | 2000259378 A | * | 9/2000 |
| JP | 2000-351241 | | 12/2000 |
| JP | 2001-109599 | | 4/2001 |
| JP | 2002-073313 | | 3/2002 |

* cited by examiner

*Primary Examiner*—Jerome Grant, II
(74) *Attorney, Agent, or Firm*—Fitzpatrick, Cella, Harper & Scinto

(57) ABSTRACT

In an information processing apparatus, which can communicate with a first output apparatus having a copying function of printing based on a scanned document image, and a second output apparatus having a print function of printing image data transmitted from an external device in a predetermined format, and has a server function of managing output jobs in the first and second output apparatuses, first output job information of a copy job to be executed by the first output apparatus is acquired. During execution of an output job, occurrence of any obstacle that disturbs execution of a job is detected. When it is detected that an obstacle has occurred during execution of the output job in the first output apparatus, the second output apparatus is controlled to execute a substitution print process based on the first output job information. In this way, a printer having only a print function can execute an output job of a copying machine or facsimile apparatus other than a print function.

18 Claims, 16 Drawing Sheets

FIG. 7

| APPARATUS NAME | | OBSTACLE CONTENTS | AUTOMATIC OUTPUT DESTINATION CHANGE | MANUAL OUTPUT DESTINATION CHANGE |
|---|---|---|---|---|
| COPY1 | Copy Job | FEEDER JAM | NOT EXECUTE | NOT EXECUTE |
| | | SORTER JAM | NOT EXECUTE | EXECUTE |
| | | DOOR OPEN | NOT EXECUTE | NOT EXECUTE |
| | | NO PAPER | PRINTER1 | . . |
| | | : | : | : |
| | Print Job | ALL | SUBSTITUTION PRINT SETUP OF PRINT SERVER | SUBSTITUTION PRINT SETUP OF PRINT SERVER |
| | : | : | : | : |

FIG. 13A

TRANSMISSION QUEUE(OUTPUT QUEUE) 102

| STATUS | ORDER INFORMATION | TRANSMISSION QUEUE(job ID) |
|---|---|---|
| . | . | . |
| . | . | . |
| . | . | . |
| . | . | . |
| . | . | . |
| 1301 STANDBY | 13 : 03 | 102job-p0002 |
| 1302 OUTPUT IN PROGRESS | 13 : 01 | 102job-p0001 |

FIG. 13B

TRANSMISSION QUEUE(OUTPUT QUEUE) 103

| STATUS | ORDER INFORMATION | TRANSMISSION QUEUE(job ID) |
|---|---|---|
| . | . | . |
| . | . | . |
| . | . | . |
| 1303 SPOOL IN PROGRESS | 13 : 08 | 103job-p0005 |
| 1304 STANDBY | 13 : 07 | 103job-p0004 |
| 1305 STANDBY | 13 : 06 | 103job-p0003 |
| 1306 OUTPUT IN PROGRESS | 13 : 02 | 103job-p0002 |

FIG. 13C

TRANSMISSION QUEUE(OUTPUT QUEUE) 103

| STATUS | ORDER INFORMATION | TRANSMISSION QUEUE(job ID) |
|---|---|---|
| . | . | . |
| . | . | . |
| . | . | . |
| 1307 STANDBY | 13 : 04 | 102job-c0001 |
| 1308 STANDBY | 13 : 08 | 103job-p0005 |
| 1309 STANDBY | 13 : 07 | 103job-p0004 |
| 1310 OUTPUT IN PROGRESS | 13 : 06 | 103job-p0003 |

FIG. 13D

PRINT JOB MANAGEMENT INFORMATION 102

| STATUS | ORDER INFORMATION | MANAGEMENT JOB(job ID) | ATTRIBUTE |
|---|---|---|---|
| . | . | . | . |
| . | . | . | . |
| . | . | . | . |
| 1311 INPUT IN PROGRESS | 13 : 10 | 102job-p0004 | D |
| 1312 SPOOL IN PROGRESS | 13 : 09 | 102job-p0003 | C |
| 1313 STANDBY | 13 : 03 | 102job-p0002 | B |
| 1314 OUTPUT IN PROGRESS | 13 : 01 | 102job-p0001 | A |

FIG. 13E

PRINT JOB MANAGEMENT INFORMATION 103

| STATUS | ORDER INFORMATION | MANAGEMENT JOB(job ID) | ATTRIBUTE |
|---|---|---|---|
| . | . | . | . |
| . | . | . | . |
| . | . | . | . |
| 1315 SPOOL IN PROGRESS | 13 : 08 | 103job-p0005 | d |
| 1316 STANDBY | 13 : 07 | 103job-p0004 | c |
| 1317 STANDBY | 13 : 06 | 103job-p0003 | b |
| 1318 OUTPUT IN PROGRESS | 13 : 02 | 103job-p0002 | a |

FIG. 13F

TEMPORARILY REGISTERED JOB MANAGEMENT INFORMATION(Copy job)

| STATUS | ORDER INFORMATION | TEMPORARY REGISTRATION (job ID) | ATTRIBUTE |
|---|---|---|---|
| . | . | . | . |
| . | . | . | . |
| . | . | . | . |
| OUTPUT IN PROGRESS | 13 : 04 | 102job-c0001 | E |

1319

TEMPORARILY REGISTERED JOB MANAGEMENT INFORMATION(FAX job)

| STATUS | ORDER INFORMATION | TEMPORARY REGISTRATION (job ID) | ATTRIBUTE |
|---|---|---|---|
| . | . | . | . |
| . | . | . | . |
| . | . | . | . |
| INPUT IN PROGRESS | 13 : 11 | 102job-f0005 | F |

TRANSMISSION QUEUE(OUTPUT QUEUE) 103

| | STATUS | ORDER INFORMATION | TRANSMISSION QUEUE(job ID) |
|---|---|---|---|
| | ⋮ | ⋮ | ⋮ |
| 1501 | SPOOL IN PROGRESS | 13:08 | 103job-p0005 |
| 1502 | STANDBY | 13:07 | 103job-p0004 |
| 1503 | STANDBY | 13:06 | 103job-p0003 |
| 1504 | OUTPUT IN PROGRESS | 13:02 | 103job-p0002 |

FIG. 15B

TRANSMISSION QUEUE(OUTPUT QUEUE) 103

| | STATUS | ORDER INFORMATION | TRANSMISSION QUEUE(job ID) |
|---|---|---|---|
| | ⋮ | ⋮ | ⋮ |
| 1505 | STANDBY | 13:08 | 103job-p0005 |
| 1506 | STANDBY | 13:07 | 103job-p0004 |
| 1507 | STANDBY | 13:04 | 102job-c0001 |
| 1508 | OUTPUT IN PROGRESS | 13:06 | 103job-p0003 |

FIG. 15C

PRINT JOB MANAGEMENT INFORMATION 103

| | STATUS | ORDER INFORMATION | MANAGEMENT JOB(job ID) | ATTRIBUTE |
|---|---|---|---|---|
| | ⋮ | ⋮ | ⋮ | ⋮ |
| 1509 | SPOOL IN PROGRESS | 13:08 | 103job-p0005 | d |
| 1510 | STANDBY | 13:07 | 103job-p0004 | c |
| 1511 | STANDBY | 13:06 | 103job-p0003 | b |
| 1512 | OUTPUT IN PROGRESS | 13:02 | 103job-p0002 | a |

FIG. 15D

PRINT JOB MANAGEMENT INFORMATION 103

| | STATUS | ORDER INFORMATION | MANAGEMENT JOB(job ID) | ATTRIBUTE |
|---|---|---|---|---|
| | ⋮ | ⋮ | ⋮ | ⋮ |
| 1513 | STANDBY | 13:08 | 103job-p0005 | d |
| 1514 | STANDBY | 13:07 | 103job-p0004 | c |
| 1515 | SPOOL IN PROGRESS | 13:04 | 102job-c0001 | E |
| 1516 | OUTPUT IN PROGRESS | 13:06 | 103job-p0003 | b |

PRINT JOB SUBSTITUTION IN A COPY JOB

FIELD OF THE INVENTION

The present invention relates to an output management method and information processing apparatus and, more particularly, to output management upon occurrence of obstacles in output apparatuses, which is executed in an information processing apparatus that is connected to an output apparatus having a copying function or the like, and to an output apparatus having a print function of printing image data transmitted from a connected host apparatus in a predetermined format.

BACKGROUND OF THE INVENTION

In recent years, in order to share various image output apparatuses used in an office or the like, these apparatuses are connected via a network. For example, conventionally, a printer is prevalently used as a local printer connected to a single apparatus, but is increasingly used as a network printer which is shared by apparatuses on a network.

Also, various functions are installed in a single apparatus to build a hybrid machine. For example, a copying machine, which is installed with a printer controller having an image processing function, and serves as both a copying machine and printer, is commercially available. A facsimile function or the like is further added to such copying machine, and more advanced multi-functional apparatuses are available.

In an environment in which a plurality of hybrid machines as such output apparatuses are used by connecting them to a network, if any obstacle (such as a trouble or a fault) has occurred in one hybrid machine, it is desirable that another hybrid machine takes the place of the hybrid machine that has caused the obstacle, so as to execute its job.

As an example of such substitution process, Japanese Patent Laid-Open No. 10-011242 describes the following mechanism. That is, when an obstacle that has occurred in a printer which is executing a print job is detected, a substitution printer which substitutes that printer is selected on the basis of a measure to be taken for the obstacle, and the selected substitution printer continues execution of the print job.

However, such job substitution can be done between only identical models or limited models which have compatibility in an output method, data format, job transfer method, and the like.

For this reason, the user who wants to use job substitution must purchase two or more identical models or similar apparatuses, and cannot use a printer, copying machine, or facsimile apparatus of another model as a substitution output destination if he or she possesses such apparatus.

Even when a printer is a hybrid machine having a copying function and facsimile function, jobs other than PDL (Page Description Language) print jobs, e.g., a copy job of the copying function, and a facsimile job that outputs image data received by the facsimile function, cannot be substituted upon occurrence of obstacles.

Upon substituting a print job in such print system, it is a common practice to transmit an identical print job to another printer in advance irrespective of whether or not a print job is normally processed, and to designate execution of the print job at that printer when any obstacle has occurred. However, the user is required to make some setups and operations (e.g., he or she must delete job data that becomes unnecessary when no obstacle occurs), resulting in inconvenience.

Furthermore, in order to substitute a print job without requiring any extra operations, a function of searching for and determining an output apparatus which serves as a substitution destination, making data conversion for a substitution print process, and sending the converted data to the substitution destination apparatus may be provided to each output apparatus. However, print schemes and data formats different from those which are assumed in advance cannot be coped with, and it is difficult to modify to cope with such different print schemes and data formats.

SUMMARY OF THE INVENTION

It is an object of the present invention to provide an output management method, which can execute an output job of a copying machine or facsimile apparatus other than a normal print job using a PDL using a substitution printer having only a print function using the PDL.

It is another object of the present invention to provide an information processing apparatus, which can execute an output job of a copying machine or facsimile apparatus other than a normal print job using a PDL using a substitution printer having only a print function using the PDL.

An output management method which can achieve the above object according to one aspect of the present invention is an output management method for an information processing apparatus, which can communicate with a first output apparatus having a copying function of printing based on a scanned document image, and a second output apparatus having a print function of printing image data transmitted from an external device in a predetermined format, and comprises a server function of managing output jobs in the first and second output apparatuses, comprising: a first acquisition step of acquiring first output job information of a copy job to be executed by the first output apparatus; a detection step of detecting occurrence of any obstacle that disturbs execution of a job during execution of an output job; and a substitution output step of controlling the second output apparatus to execute a substitution print process based on the first output job information upon detection of occurrence of the obstacle during execution of the output job in the first output apparatus in the detection step.

An information processing apparatus which can achieve the other object according to one aspect of the present invention is an information processing apparatus, which can communicate with a first output apparatus having a copying function of printing based on a scanned document image, and a second output apparatus having a print function of printing image data transmitted from an external device in a predetermined format, and comprises a server function of managing output jobs in the first and second output apparatuses, comprising: first acquisition means for acquiring first output job information of a copy job to be executed by the first output apparatus; detection means for detecting occurrence of any obstacle that disturbs execution of a job during execution of an output job; and substitution output means for controlling the second output apparatus to execute a substitution print process based on the first output job information upon detection of occurrence of the obstacle during execution of the output job in the first output apparatus by said detection means.

That is, in one aspect of the present invention, an information processing apparatus which can communicate with a first output apparatus having a copying function of printing an image based on a scanned document image, and a second output apparatus having a print function of printing image data externally transmitted in a predetermined format, and has a server function of managing output jobs in the first and second output apparatuses, acquires first output job information of a copy job to be executed by the first output apparatus, detects occurrence of any obstacle that disturbs execution of the job during execution of the output job, and controls the second output apparatus to execute a substitution print process based on the first output job information upon detection of occurrence of the obstacle during execution of the output job in the first output apparatus.

In this way, an output job of a copying or facsimile function other than a print function can be executed by a substitution printer having only the print function.

Since a substitution print job is transmitted after detection of occurrence of an obstacle, information and data associated with a substitution print process need not be transmitted to another output apparatus until the substitution print process is actually required. Therefore, operations and labors required for the substitution print process can be simplified compared to the conventional system.

Furthermore, since the information processing apparatus with the server function can perform data conversion and job transfer, the user can realize a substitution print process using a system as a free combination of various output apparatuses independently of the functions and performances unique to output apparatuses. Also, the degree of freedom when the user introduces a new output apparatus can be increased.

Preferably, the detection step includes a step of monitoring occurrence of an obstacle by monitoring based on the first output job information, and the method further comprises a notification step of notifying an external client computer of a monitoring result based on monitoring in the detection step.

The method may further comprise an update step of reflecting the first output job information onto a second job output queue of the second output apparatus, and wherein the substitution output step includes a step of transmitting a job on the basis of the second job output queue updated in the update step.

In this case, the first output job information may contain first order information, and the update step include a step of updating the second job output queue on the basis of the first order information, and second order information of a job in the second output apparatus.

More preferably, the method further comprises a suppression step of suppressing registration of the copy job acquired in the first acquisition step in a job output queue on the basis of the first output job information, and wherein the update step includes a step of executing a registration process of the copy job to the second job output queue based on the first output job information in the detection step.

The first output job information may contain management information used to manage the output job and/or image data to be output.

The substitution output step may include a conversion step of converting a format of image data based on the first output job information into a format that the second output apparatus can process.

Preferably, the method further comprises a substitution determination step of determining in accordance with setup information set by a user in advance whether or not a substitution process is to be executed for each output job type.

In this case, the setup information may contain information of an obstacle that may occur for each output job type, and execution/non-execution of a substitution process upon occurrence of that obstacle.

An output management method which can achieve the above object according to one aspect of the present invention is an output management method for an information processing apparatus, which can communicate with a first output apparatus having a copying function of printing based on a scanned document image, and a second output apparatus having a print function of printing image data transmitted from an external device in a predetermined format, comprising: a detection step of detecting an obstacle of a copy job to be executed by the first output apparatus; and a substitution process step of executing the copy job in the first output apparatus as a print job in the second output apparatus upon detection of the obstacle in the detection step.

An information processing apparatus which can achieve the other object according to one aspect of the present invention is an information processing apparatus, which can communicate with a first output apparatus having a copying function of printing based on a scanned document image, and a second output apparatus having a print function of printing image data transmitted from an external device in a predetermined format, comprising: detection means for detecting an obstacle of a copy job to be executed by the first output apparatus; and substitution process means for executing the copy job in the first output apparatus as a print job in the second output apparatus upon detection of the obstacle by said detection means.

The above objects can also achieved by a computer program which implements the aforementioned output management method using a computer apparatus, and also a storage medium that stores the program.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 shows an example of an output destination change instruction table used in the present invention;

FIGS. 13A to 13F show the states of job management information and a transmission queue (output queue), which are looked up and updated upon execution of the flow charts shown in FIGS. 11 and 12;

FIGS. 15A to 15D show job management information and information of a transmission queue (output queue), which are updated according to the flow chart shown in FIG. 14.

DETAILED DESCRIPTION OF THE PREFERRED EMBODIMENTS

Preferred embodiments of the present invention will now be described in detail in accordance with the accompanying drawings.

First Embodiment

Figure 1:
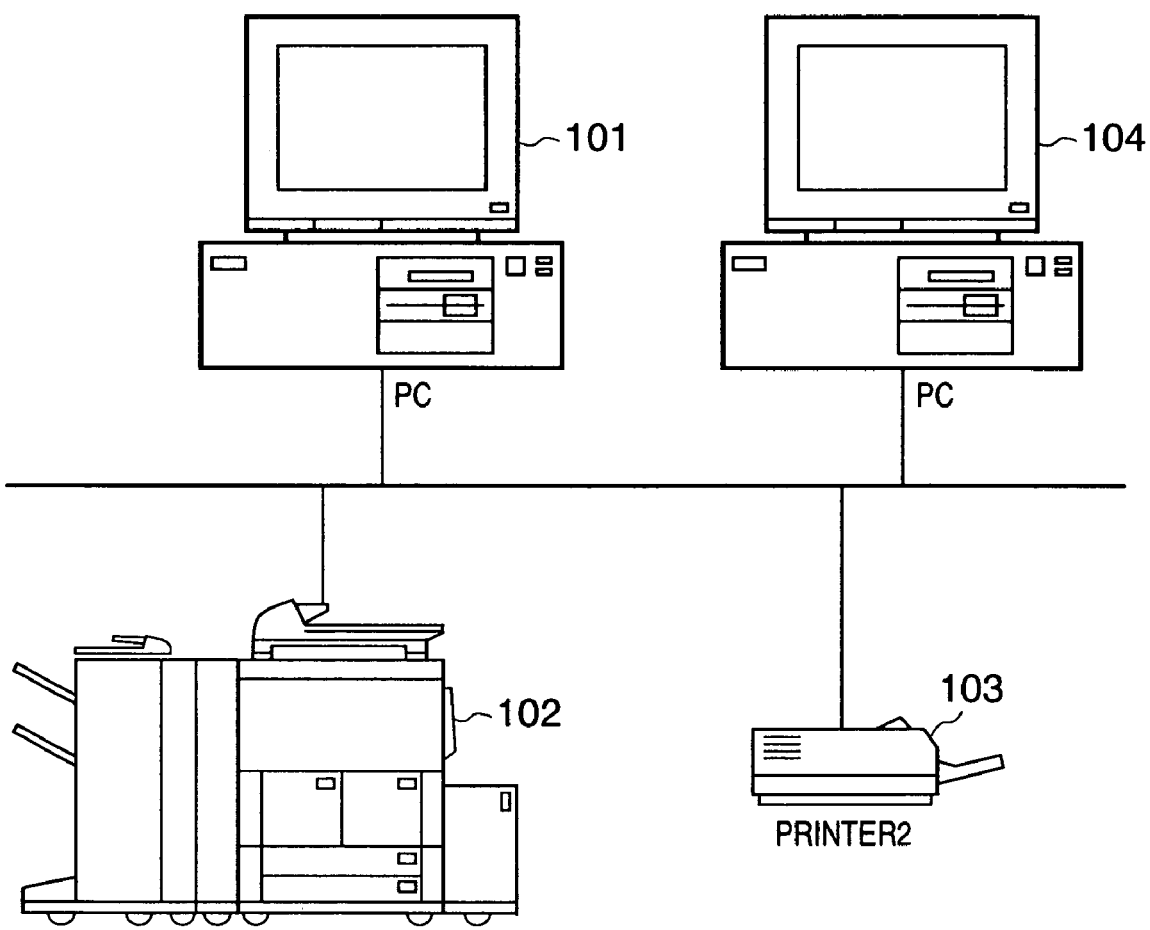
FIG. 1 is a diagram showing an embodiment of the configuration of a print system according to the present invention.

FIG. 1 shows an embodiment of the configuration of a print system according to the present invention. Referring to FIG. 1, reference numeral 101 denotes a personal computer (PC) which serves as a print server that implements an output management method according to the present invention; 102, a copying machine (digital hybrid machine) as a destination of a substitution print request in this embodiment; and 103, a printer which is managed by the print system as an output destination of a client computer 104 on a network. The print server 101, copying machine 102, printer 103, and client computer 104 are connected via a network line. Jobs are input from the client computer 104 to the copying machine 102 and printer 103 under the management of the print server 101 in the following embodiments. Alternatively, jobs may be input from the client computer 104 to respective output destinations without the intervention of the print server 101.

In FIG. 1, the print server comprises a single PC. Alternatively, a print server system in which a plurality of PCs share or execute by collaborative means for implementing a sequence according to an embodiment of the present invention may be adopted. In this embodiment to be described below, the output apparatuses of the print system include the copying machine and printer which are connected to the print server via the network. However, the output management method of the present invention can be applied to various cases independently of the connection method of the print server and output apparatuses.

Figure 2:
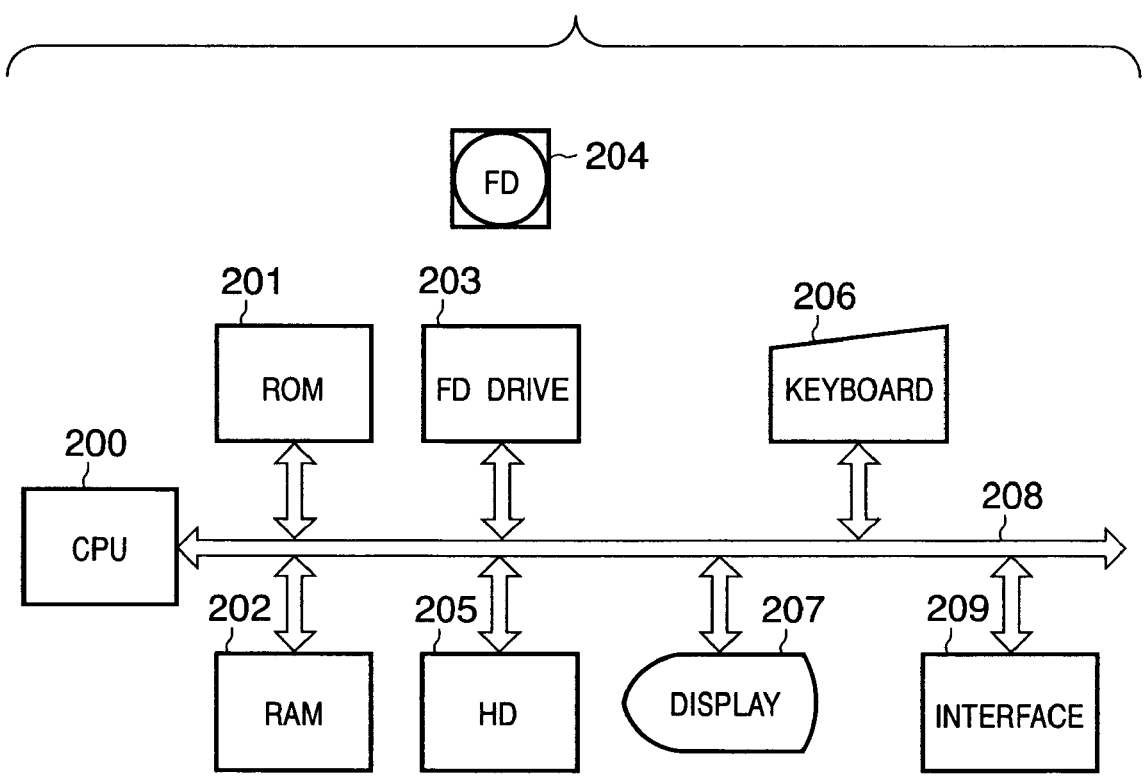
FIG. 2 is a block diagram showing a schematic control arrangement of a PC shown in FIG. 1.

FIG. 2 is a block diagram showing a schematic arrangement of the PC shown in FIG. 1. Referring to FIG. 2, reference numeral 200 denotes a CPU; 201, a ROM; and 202, a RAM. The CPU 200 executes various processes on a client using an area in the RAM 202 as a work memory in accordance with a program stored in the ROM 201 or RAM 202 or a program loaded from a storage medium or external device onto the RAM.

Figure 5:
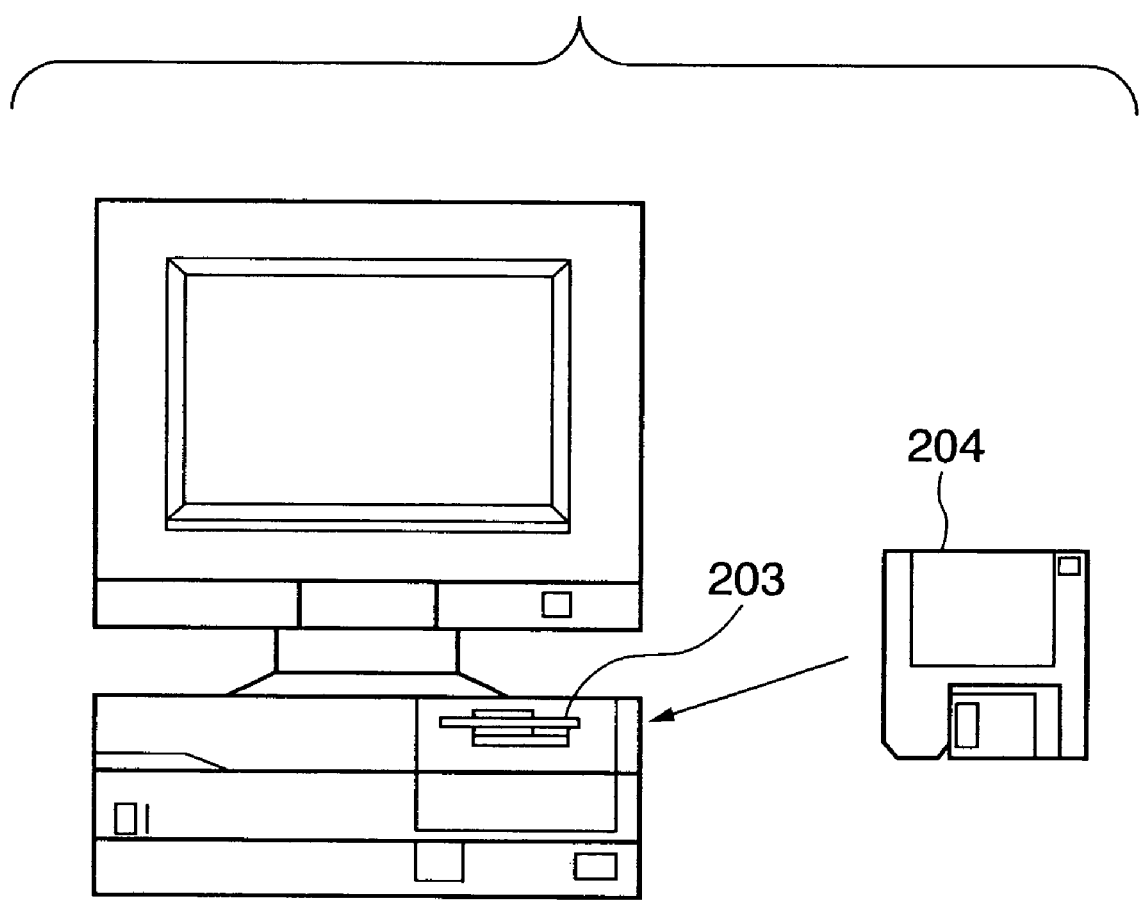
FIG. 5 shows the relationship between the computer in FIG. 1 and FD.

Reference numeral 203 denotes an FD drive, which receives a floppy disk® 204 as a storage medium, as shown in FIG. 5. When the CPU 200 reads out and executes information stored in the floppy disk 204, the print server 101 can control the copying machine 102 and printer 103.

Figure 4:
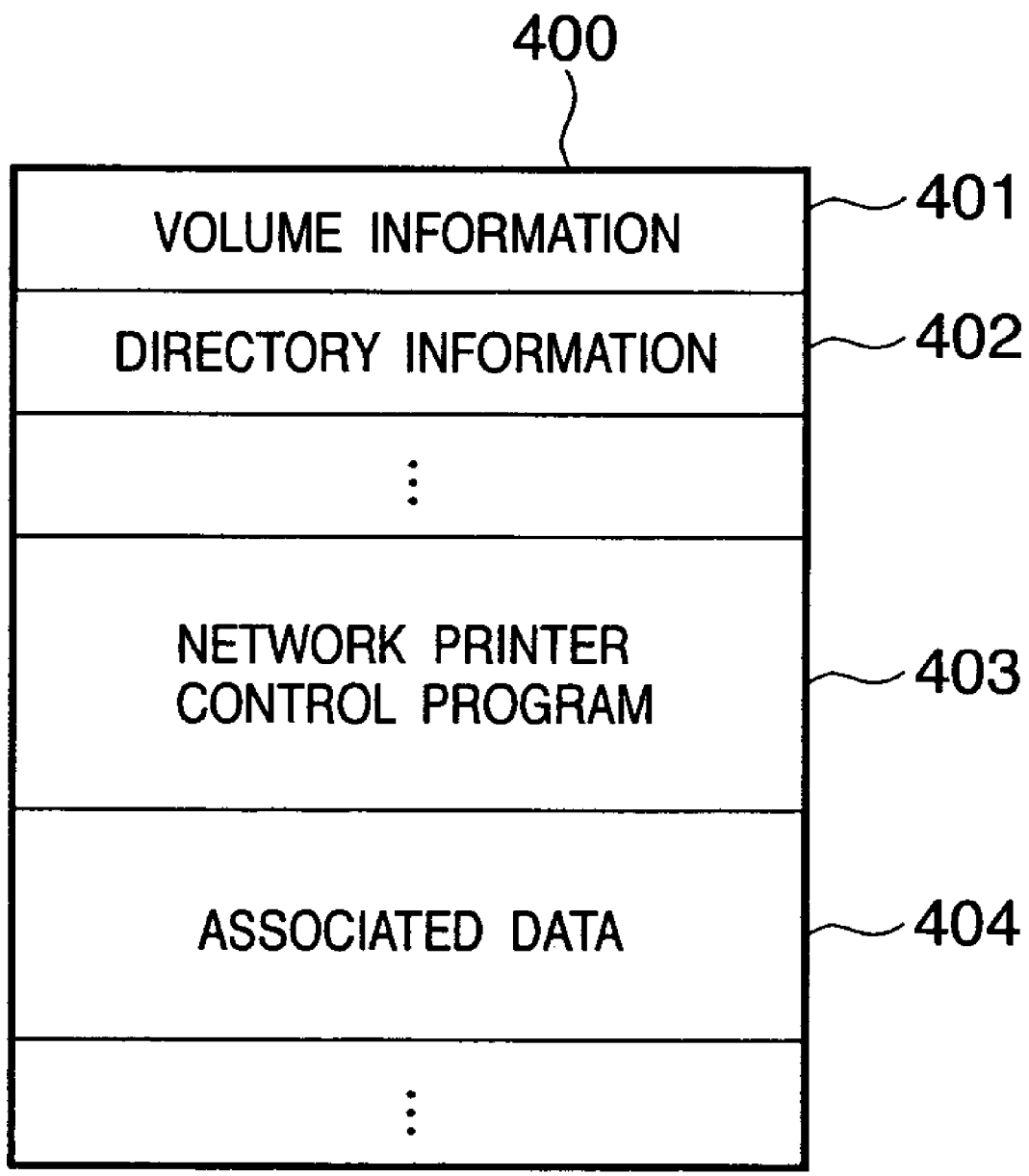
FIG. 4 shows the memory map of data stored in the FD.

FIG. 4 shows a memory map of data stored in the floppy disk 204. As shown in FIG. 4, the floppy disk 204 stores volume information 401, directory information 402, a control program 403 for the network printers 102 and 103, and associated data 404.

Figure 3:
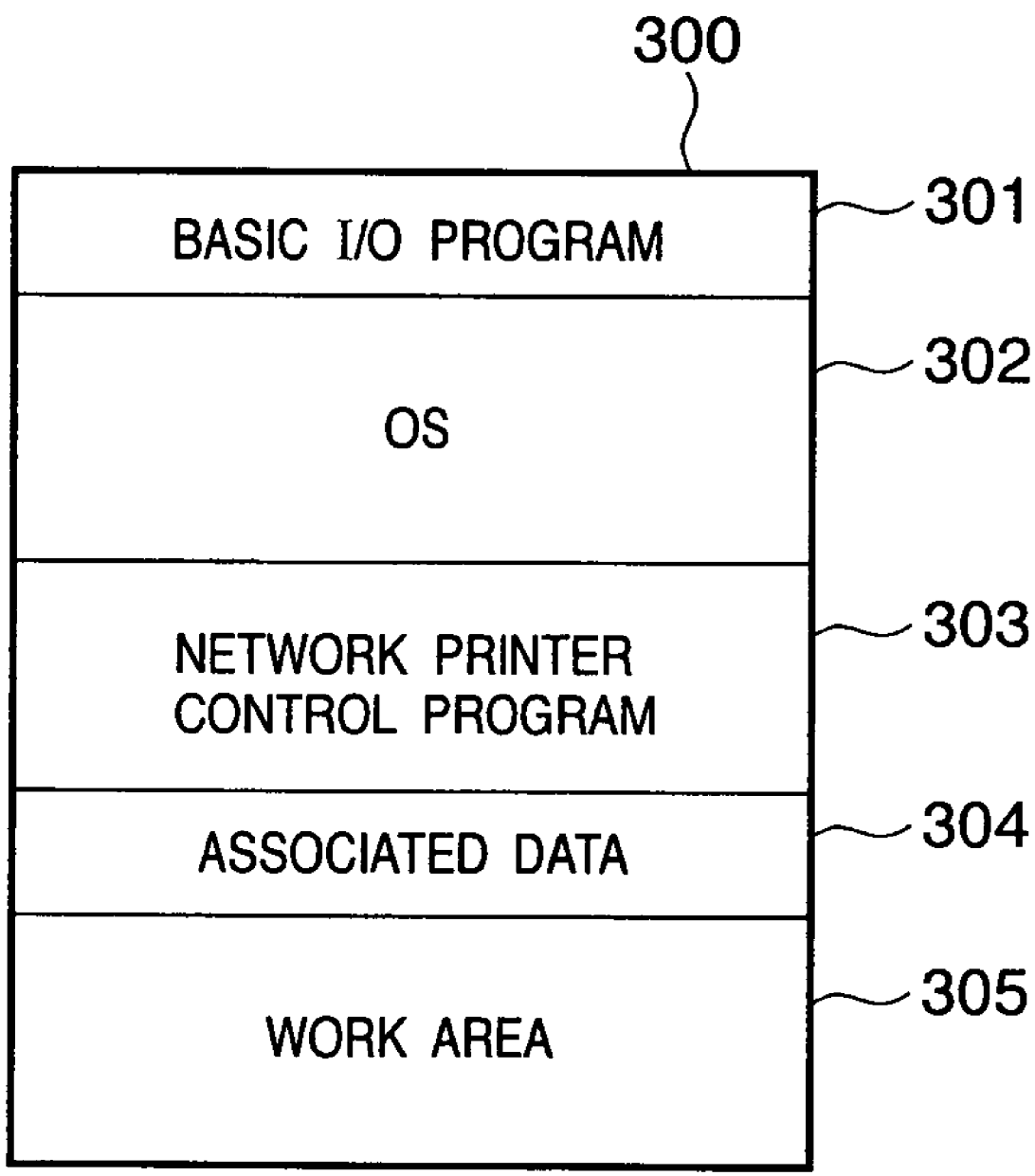
FIG. 3 shows a memory map upon mapping a program from an FD onto a RAM in FIG. 2.

FIG. 3 shows a memory map when the control program 403 (303) is read out from the floppy disk 204 and is mapped on the RAM 202 to be ready to run. As shown in FIG. 3, the RAM 202 stores a basic I/O program 301, operating system (OS) 302, and a network printer control program 303 and associated data 304, which are mapped from the floppy disk 204, and the remaining area is used as a work area 305.

Referring back to FIG. 2, reference numeral 206 denotes a keyboard serving as input means; 207, a display serving as display means; and 208, a network board. The network board 208 has a communication function. The aforementioned components 200 to 208 (except for 204) are connected via a system bus 209, and can exchange data with each other.

The output management method in this embodiment with the above arrangement will be explained below.

FIG. 7 shows an example of an output destination change instruction table used in this embodiment. In this embodiment, such table indicating whether or not an output destination can be changed is prepared in advance for each output apparatus managed by the print server in accordance with a user's instruction.

Information of the table managed by the print server can be set/changed in accordance with contents input via a browser using a Web server function, which is provided to a network server and digital hybrid machine located at a remote place from the print server.

The contents of the table include obstacle contents and setups associated with changes in output destination (as to whether an output destination is changed automatically or manually) upon occurrence of corresponding obstacles for each of job types of an output apparatus such as a print job when the output apparatus is used as a network printer, a copy job when the output apparatus is used as a copying machine, a facsimile job generated by facsimile reception, and the like.

This output destination change instruction table is preferably stored in both the print server and each output apparatus, so as to quickly execute a substitution print process upon occurrence of any obstacle. However, such table may be stored in one of the print server and output apparatus, and the print server may execute a substitution print process after it confirms that the table is the latest one.

The present invention is not limited to a specific designation method of an output apparatus as a substitution print destination, as long as designation information is managed and recognized in units with which the print server can specify an output apparatus.

For example, a method of designating an output apparatus for each printer object used in a print process like in Windows® available from Microsoft Corporation, which registers a substitution printer object for each printer object, or a method of designating an output apparatus for each IP address like in a case wherein a network printer is identified using an IP address to register a substitution printer, may be used.

Figure 6:
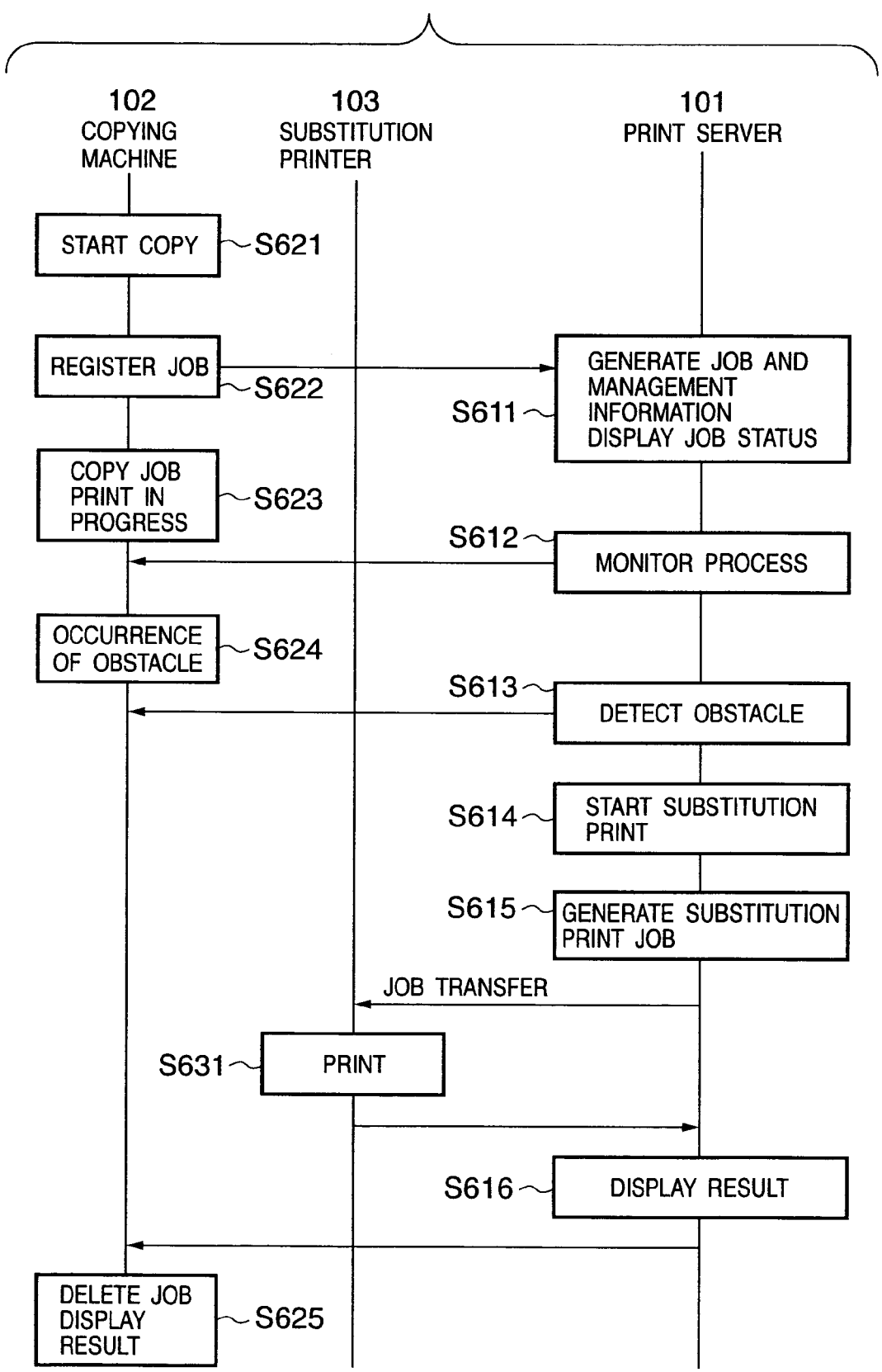
FIG. 6 is a sequence chart showing the execution sequence of a substitution print process in the system shown in FIG. 1.

FIG. 6 is a sequence chart showing the process upon executing a substitution print process of this embodiment. A substitution print process of this embodiment will be described below with reference to FIG. 6. In the following description, assume that the output apparatus is the copying machine 102 in FIG. 1, and the user has issued a copy instruction, for the sake of simplicity.

When the user sets a document and inputs a copy start instruction on the copying machine (S621), the copying machine 102 scans a document images, and generates and registers a copy job for the scanned image data (S622).

In this embodiment, the data format of this copy job is not particularly limited, and image data of an arbitrary format that any of connected output apparatuses can process may be used. For example, image data of a format which does not depend on the output apparatus such as XML, JPEG, or the like, may be preferably used. Also, a PDL (page description language) format such as PostScript of Adobe Systems, inc., LIPS of Canon Inc., PCL of Hewlett-Packard Company, and the like may be used.

The copying machine 102 transfers information of this copy job to the print server 101. The transfer method in this case is not limited to any specific protocols, communication apparatuses, and the like as long as a job and information indicating the attribute of the job can be transferred to the print server 101.

Upon reception of the job information, the print server 101 generates job management information like "JOB_INFO_2" in Windows, and a copy of image data of the job (S611), and begins to monitor the device status and job status of the copying machine 102 that registered the job (S612). In this embodiment, the monitoring process using polling will be exemplified. Alternatively, a trapping method in which the copying machine 102 informs the print server 101 of a change in status may be adopted.

At this time, the print server 101 does not add that job to a spooler of any output apparatus. When the copy job of the copying machine has terminated normally, the print server system deletes the management information and copy of the image of this job.

The copying machine 102 executes a print process (S623) immediately after it registers the job in step S622. Occurrence of any obstacle during this print process is monitored by the print server 101 on the basis of the device status or job status, as described above.

For example, assume that an obstacle such as "no paper" which disturbs continuation of the print process has occurred (S624). The print server 101 detects that "no paper" state based on the device status or job status (S613), and looks up the output destination change instruction table shown in FIG. 7. If a substitute print process is designated in the table, the print server 101 starts the substitute print process (S614). In the substitute print process, the print server 101 identifies a job that cannot be printed due to occurrence of the obstacle using an ID or the like, and generates a new substitution print job by copying the management information and image data of that job registered in advance (S615).

In this case, the substitution print job data is generated in correspondence with the output apparatus that executes the substitute print process in practice. For example, if the substitution printer 103 can directly output the same image data as the copying machine 102, that image data is used without any modification. However, if the substitution printer 103 cannot print image data handled by the copying machine 102, the print server 011 executes a data conversion process to convert that image data into the one which can be printed by the substitution printer 103. The conversion method in this case is not particularly limited. For example, the print server 101 may implement data conversion using the same print means as that of normal application software, as described in Japanese Patent Laid-Open No. 2001-109599. In this way, the needs for any setups unique to each substitution printer and user's setups for a special substitution print function corresponding to the situation of an output apparatus can be obviated, and the print server 101 can provide a print job as in a normal print job.

After the print server 101 generates the substitution print job, it registers that job in a spooler of the next output apparatus, and schedules that job in the same manner as a print job issued upon designation of a print process from application software on the PC.

The print server 101 manages print jobs in the order in which they are registered. At the time of a turn of the substitution print job generated in step S615, the print server 101 transmits the substitution print job to the substitution printer 103, and confirms if a print process terminates normally. As this confirmation method, a job ID or the like may be used, as described above. However, any other methods may be adopted as long as a job can be individually identified and its print result can be confirmed. For example, a confirmation method described in Japanese Patent Laid-Open No. 10-240480 may be used.

If another obstacle has occurred in this substitution print job, the print server 101 can generate a substitution print job based on the original print job, and can control another printer or output apparatus to execute a substitution print process.

Upon confirmation of normal termination of the substitution print job (S631) in the substitution printer, the print server 101 displays, on the display 207, a message indicating that the print job is completed by the substitution print process, and informs the copying machine 102 of the job ID and the output result including the output destination printer name, output method, and the like (S616). Upon reception of such information, if it is recognized that the substitution print process has succeeded, the copying machine 102 deletes the copy job, whose print process is interrupted by the obstacle, and displays the output destination and output result of the substitution print process on, e.g., its display panel (S625).

Figure 8:
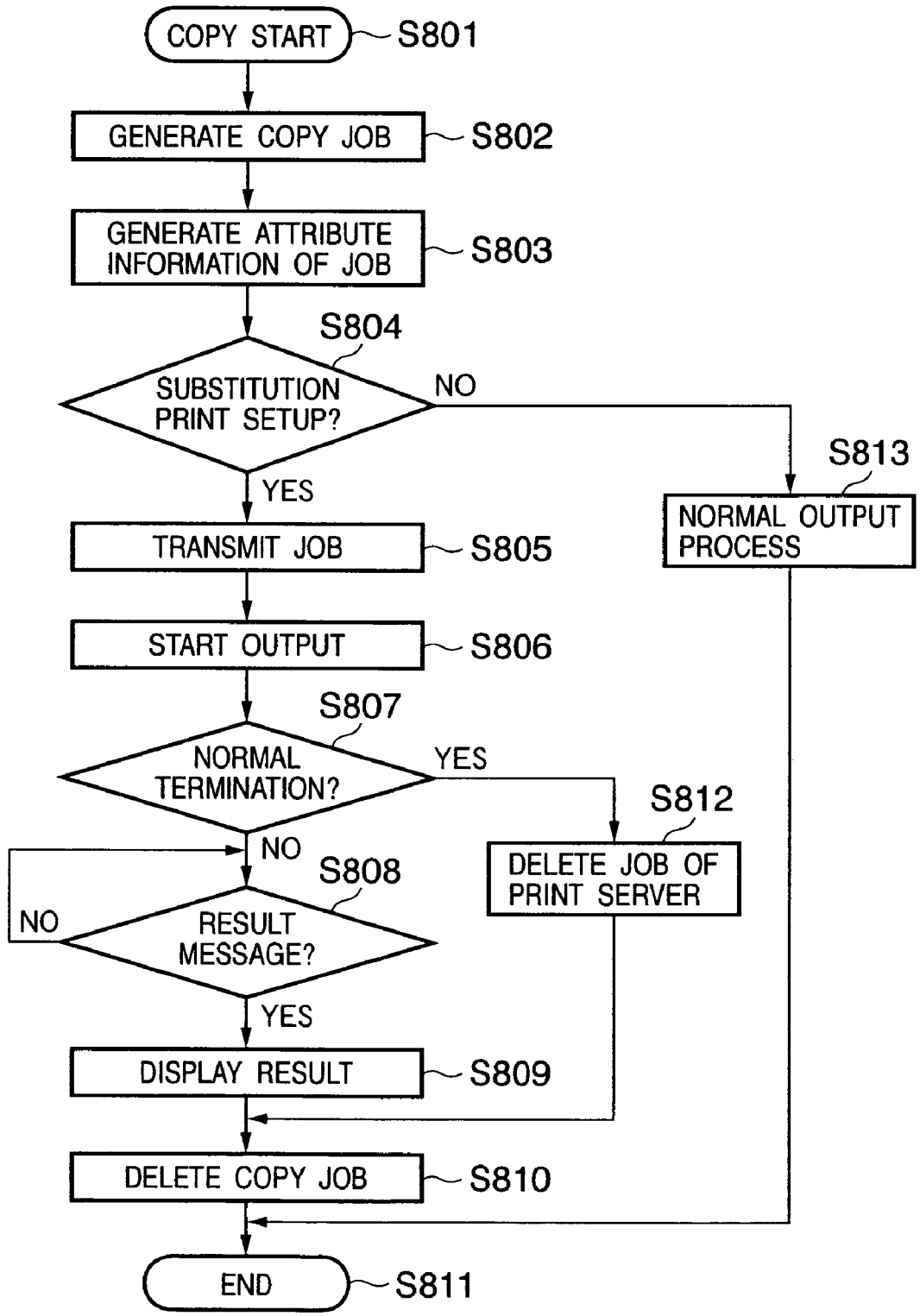
FIG. 8 is a flow chart showing the process in a copying machine upon executing the substitution print process shown in FIG. 6.

The output management method of this embodiment is implemented in the aforementioned sequence. The process of the output apparatus in the aforementioned output management method will be described below with reference to the flow chart in FIG. 8.

Assume that the copying machine 102 is connected to the PC 101 serving as the print server and the substitution printer 103 via the network, as shown in FIG. 1, and is set with the output destination change instruction table (FIG. 7) used upon occurrence of any obstacle in the copying machine.

If the user inputs a copy start instruction using an operation button or the like on the copying machine (S801), the copying machine 102 scans a document image and generates a copy job (S802), and also generates attribute information of the copy job indicating, e.g., image data with an A4 paper size (S803).

Note that this embodiment will exemplify a case wherein a copy job that copies a document image set on the copying machine is to be executed. Also, the same applies to a case wherein a facsimile job generated upon facsimile reception is to be executed. The attribute information of the facsimile job includes not only the paper size, but also those which are not contained in the copy job of the copying machine and are unique to the facsimile job, such as a facsimile source name, a telephone number of a telephone number reception device, and the like.

The copying machine checks if a substitution print process is set in the output destination change instruction table shown in, e.g., FIG. 7 (S804). Information that pertains to the setup of the substitution print process may be held by both the copying machine as an output apparatus, and the print server, or may be held by one of these apparatuses, and may be provided to the other apparatus when it is necessary.

If it is determined in step S804 that the substitution print process is set, the copying machine 102 transmits the copy job to the print server 101 (S805). This transmission method may adopt an arbitrary protocol communication sequence. Upon completion of the job transmission process, the copying machine 102 begins to output the copy job (S806). When the operation of the copying machine stops, it is checked if the copy job has terminated normally (S807). If the copy job has not normally terminated, it is determined that some obstacle has occurred, and the copying machine waits for a result message from the print server (S808).

As described above, in this embodiment, since the print server 101 monitors occurrence of an obstacle in the copying machine and the status of a registered job by polling or the like, the copying machine 102 need only wait for a result message from the print server 101 after the obstacle has occurred. However, the copying machine 102 may notify the print server 101 of occurrence of an obstacle or job status, and may then wait for a result message.

Upon completion of the substitution print process in the sequence that has been described above using the sequence chart shown in FIG. 6, the print server 101 outputs an output result message of the substitution print job. Upon reception of this message, the copying machine 102 displays, on its panel or the like, a message indicating that the print job has been done by the substitution printer (S809), and deletes the copy job (S810), thus ending its process (S811).

If it is determined in step S807 that the copy job has terminated normally without any obstacle, the copying machine 102 deletes the copy of the copy job and job management information registered in the print server 101 (S812). After that, the flow advances to step S810 to delete the copy job in the copying machine, thus ending the process.

If it is determined in step S804 that no substitution print process is set, the copying machine executes a normal copying process (S813), thus ending the process.

In this embodiment, the substitution printer prints all pages to be printed by the copy job. Alternatively, the print server 101 may acquire the number of pages that have already been printed by the copying machine upon monitoring job status, and may generate a job that prints only non-output pages of the copy job upon execution of the substitution print process.

Figure 9:
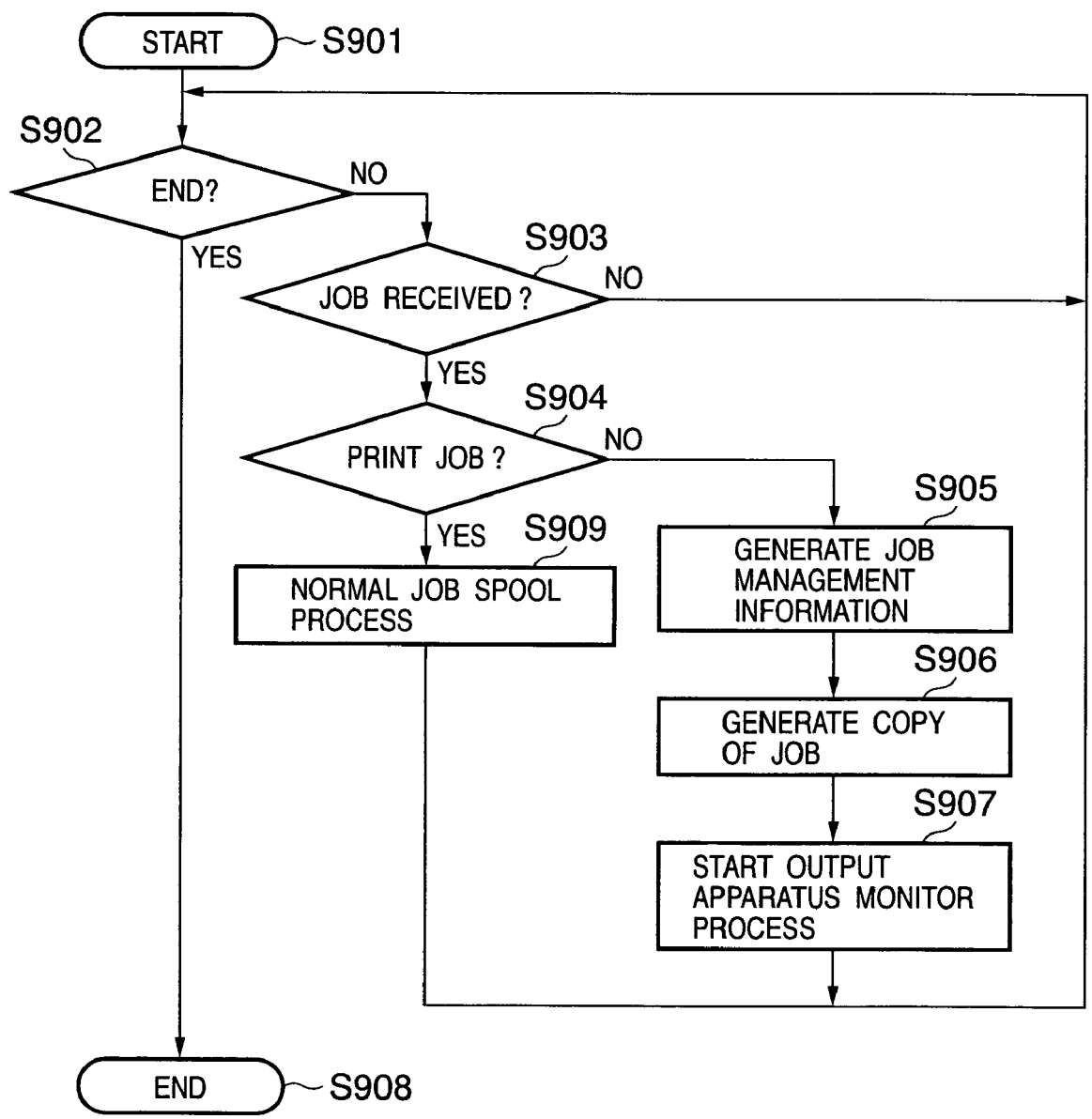
FIG. 9 is a flow chart showing a job registration process in a print server.

The job registration process of the print server 101 of this embodiment will be described below using the flow chart of FIG. 9.

If a program of the print server is launched on the PC (S901), an initialization process is executed. Upon completion of the initialization process, it is checked if an end instruction is received from a UI (user interface), an API that mediates a user's instruction from another software, or the like (S902). If no end instruction is received, it is checked if a registration message of an arbitrary job is received (S903).

If a registration message of an arbitrary job is received, it is checked if the received job is a print job (S904). If the received job is other than a print job, job management information used to manage a new job generated by an output apparatus is generated (S905). This job management information contains information such as the name and address of the output apparatus which generated the job, the type of image data of the job, and the like, and holds the job ID managed within the copying machine 102 and that of a substitution output destination to associate these jobs with each other.

After the job management information is generated, a copy of image data transmitted from the copying machine 102 is generated in a file format, and its file name is registered in the job management information (S906). Upon generation of the job management information and image data file, a monitor process of the copying machine 102 starts (S907). In this way, the registration process of one copy job is completed, and the flow returns to step S902.

If it is determined in step S904 that the job, whose registration message has been received, is a print job from another PC or application software on the print server, a normal spool process of the print job is executed (S909). If it is determined in step S902 that an end instruction is received at an arbitrary timing, the print server process ends (S908).

Figure 10:
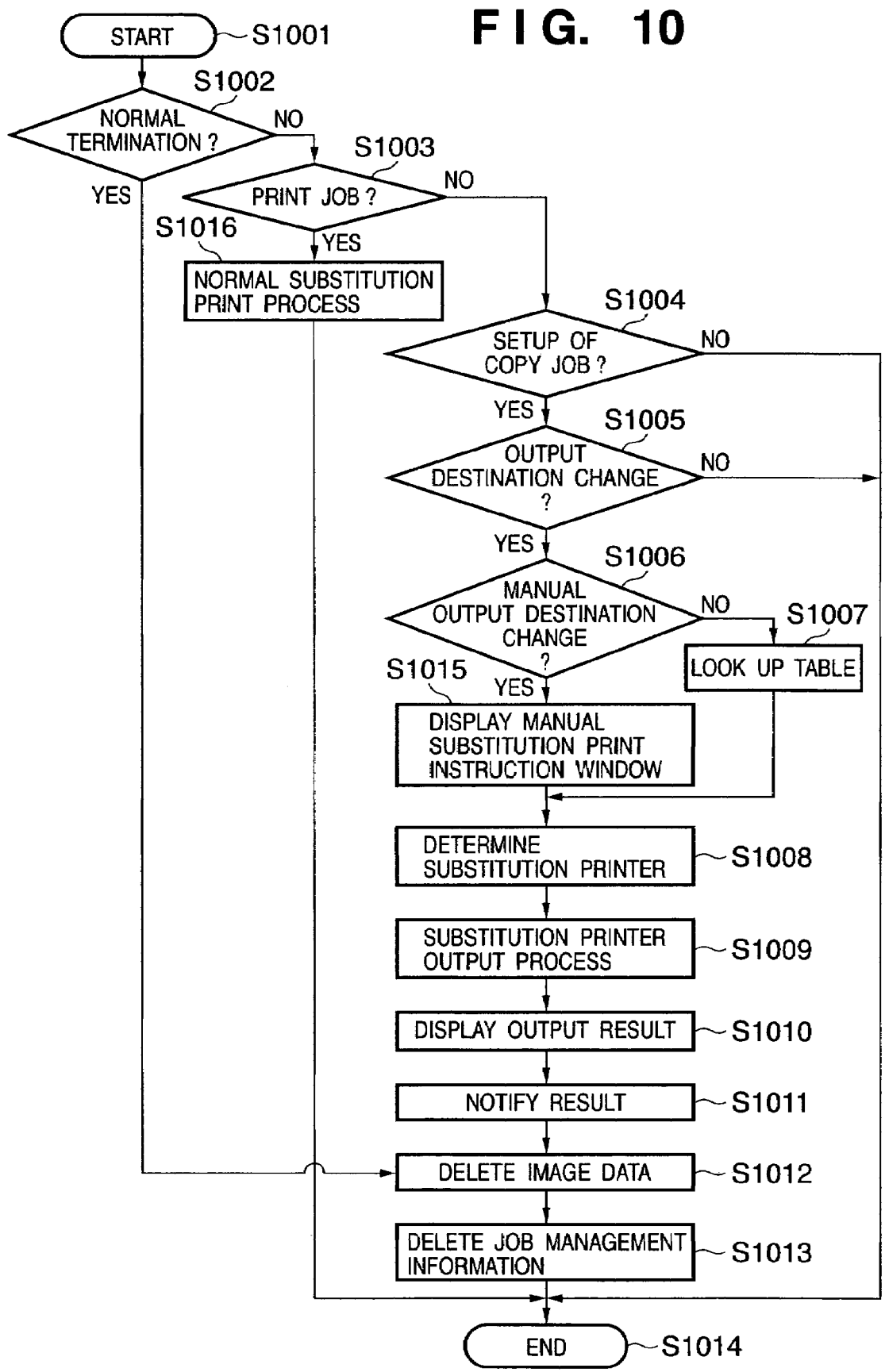
FIG. 10 is a flow chart showing the process in the print server upon executing the substitution print process shown in FIG. 6.

The sequence of the process associated with substitution print in the print server of this embodiment will be described below with reference to the flow chart in FIG. 10. Note that the process to be described below is executed when the monitor process of the copying machine 102 starts in step S907 and then ends in step S908 in FIG. 9.

If the process starts in response to the end instruction in step S908 (S1001), it is checked if the copying machine 102 has terminated normally (S1002). If the copying machine has terminated before normal termination of the job, it is recognized that any obstacle has occurred, and a substitution print process starts.

In this case, it is checked if the job type is a print job (S1003). If the job type is not a print job, it is determined that the job type is a copy job, and the presence/absence of a substitution print setup for the copy job is confirmed with reference to the output destination change instruction table shown in FIG. 7 (S1004). If no setup associated with the copy job is found, the print server ends without any process. That is, no substitution print process is executed in such case.

If the substitution print setup of the copy job is found in step S1004, the presence/absence of an output destination change instruction is confirmed (S1005). Even when the substitution print setup is found, if a setup that skips substitution print depending on the obstacle type or by a user's instruction is found, the print server ends without any process. On the other hand, if the output destination change instruction is set in step S1005, it is determined whether a manual or automatic output destination change instruction is set (S1006). If the automatic output destination change instruction is set, the table shown in FIG. 7 is looked up (S1007) to read contents indicating that the automatic substitution print process to printer 1 is executed upon detection of "no paper" in a copy job, thereby determining a substitution printer (S1008).

After the substitution printer is determined, a job is transferred to that printer to execute the substitution print process (S1009). At this time, a substitution print job is generated by executing the data conversion process that has been explained using the sequence chart of FIG. 6 as needed, and is transferred to the substitution output apparatus.

If it is confirmed that the substitution print job has been normally printed, a message indicating that the substitution print job has terminated normally is displayed on the display of the print server (S1010), and the copying machine 102 as the output source of the job is informed of the output destination and output result of the substitution print job (S1011). In the substitution print process, if the output method has been changed (e.g., when a printer which cannot execute a double-sided print process executes a substitution print process in a single-sided print mode although a double-sided print mode is designated), a final output method is informed together.

After the result message is output, the image data of the job held by the print server is deleted (S1012) and the job management information is deleted (S1013), thus ending the substitution print process based on the output management method of this embodiment (S1014).

If a manual output destination change instruction is set in step S1006, a manual substitution print instruction window is displayed (S1015), and a substitution printer is determined in accordance with a user's input (S1008). The subsequent processes are the same as those in the automatic substitution print process.

If it is determined in step S1003 that the type of the job that has caused the obstacle is a print job, a normal substitution print process in the print server is executed (S1016). In this way, since the substitution print function for a normal print job is used in combination, the print server of this embodiment can similarly execute a substitution print process irrespective of the types of jobs, and can output jobs to respective output apparatuses in a schedule that the user intended.

Furthermore, if it is determined in step S1001 that the job of the copying machine has terminated normally, this process ends without any substitution print process after the processes in steps S1012 and S1013 are executed.

As described above, according to this embodiment, even copy and facsimile jobs can undergo substitution print processes in various output apparatuses having different printable data formats (XML, JPEG, EMF, Bitmap (raster data), PDL data, and the like.

A job is transmitted to the output apparatus which executes a substitution print process after any obstacle has occurred, i.e., since information and data associated with the substitution print process need not be transmitted to another output apparatus until the substitution print process is required in practice, thus obviating the need for any redundant operations and management (e.g., data of a job is transmitted in advance to another output apparatus, and the data of the job which becomes unnecessary is deleted when a print process is normally done).

Furthermore, the user can realize a substitution print process using a system which freely combines various output apparatuses independently of functions and performances unique to the output apparatuses such as output methods, data formats, job transfer protocols, and the like. A new output apparatus which may be connected in the future can be effectively used as a substitution print apparatus by updating only the version of software of the print server, and the degree of freedom when the user introduces a new output apparatus can be increased.

In the above embodiment, the PC that serves as the print server controls the printer to execute a substitution print process of a copy job. The same applies to a substitution print process of a facsimile job that prints received facsimile images. The output apparatus which executes the substitution print process may be another output apparatus such as a copying machine or facsimile apparatus having a print function. Furthermore, the print server which controls the output apparatuses is not limited to the PC. For example, another type of computer apparatus such as a workstation or the like may be used, or a system in which a plurality of computers collaborate, may control output apparatus by sharing respective functions to change an output destination.

The present invention is not limited to a substitution print process. For example, the present invention can be applied to any other processes such as a facsimile transmission process, electronic bulletin board, mail transmission, and the like as long as such process manages document data as a job in an output or transmission process of data that the user can recognize it as a document.

Second Embodiment

The second embodiment of the present invention, i.e., a process associated with step S1009 in FIG. 10 that has been explained in the first embodiment, will be described in more detail below. The arrangement and process of the print system/apparatus in the second embodiment are basically the same as those in the first embodiment, and a detailed description of the same parts will be omitted. For the sake of simplicity of the specification, only contents to be emphasized in the second embodiment will be described in detail below. In the third and fourth embodiments as well, a detailed description will be similarly omitted as needed.

Figure 11:
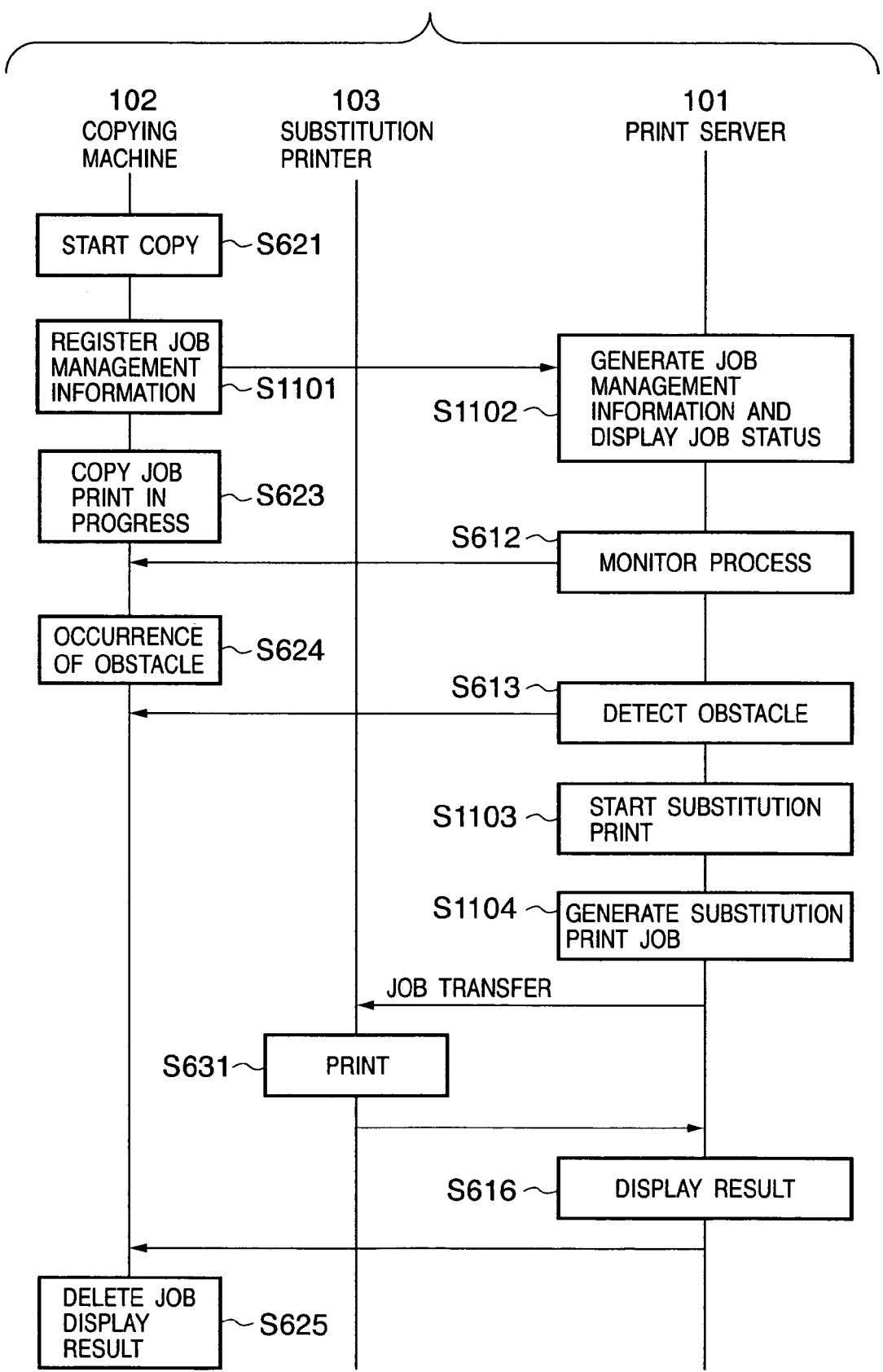
FIG. 11 is a sequence chart showing the execution sequence of a substitution print process in the system shown in FIG. 1 according to the second embodiment.

FIG. 11 shows the flow of a substitution process as in FIG. 6 explained in the first embodiment. This substitution process includes a process of an information processing apparatus. The information processing apparatus can communicate with a first output apparatus having a copying function of printing an image based on a scanned document image, and a second output apparatus having a print function of printing image data externally transmitted in a predetermined format, and has a server function of managing output jobs in the first and second output apparatuses. The substitution process acquires first output job information of a copy process executed by the first output apparatus, and detects occurrence of any obstacle that disturbs execution of the job during execution of the output job. Upon detection of occurrence of the obstacle during execution of the output job in the first output apparatus, the substitution process controls the second output apparatus to execute a substitution print process on the basis of the first output job information. Note that the same step numbers in FIG. 11 denote the same processes as those in FIG. 6.

If a copy start instruction is input on the copying machine 102 in step S621, a process corresponding to step S622 in the first embodiment is executed in step S1101. In the second embodiment, job management information alone is registered in the print server 101 as job information, and print data (image data) is acquired from the output apparatus 102 as a source of the obstacle when a substitution print process starts in step S1103 based on obstacle detection in step S613. Of course, both job management information and image data may be registered in the print server 101 as job information at the beginning of the copy process as in the first embodiment.

In step S1102, job management information is generated and job status is displayed in response to the registration request in step S1101. More specifically, registration of a job based on output job information of a copy process acquired from the copying machine 102 into a transmission queue (output queue) is suppressed in this case.

FIG. 13F shows the state of job management information generated in this case. More specifically, job management information (1319 in FIG. 13F) is generated in response to the registration request from the copying machine 102 in step S1102.

When the print server 101 is informed that a print job based on print data transmitted from the client computer 104 in the copying machine 102 (digital hybrid machine) or printer 103 is issued, print job management information shown in FIG. 13D or 13E is generated, and a transmission queue (output queue) is generated on the basis of the generated print job management information.

In the job management information generation process of this print system, copy and FAX jobs are distinguished from a PDL print job, and a job that transmits print data based on a transmission queue (output queue) is registered in job management information which requires registration to the transmission queue (output queue). On the other hand, a job such as a copy job with which no print data is transmitted together is registered in job management information which does not require registration to the transmission queue.

More specifically, if a job registration request from the copying machine 102 or printer 103 is that of a PDL print job, job management information shown in FIG. 13D or 13E is generated and registered; if it is the registration request of a copy or FAX job, job management information shown in FIG. 13F is generated and registered.

The job management information contains job status data such as "output in progress", "standby", "spool in progress", "no paper", and the like irrespective of the type of job, i.e., a PDL print job or copy job. Such status data are monitored in steps S612 and S613 by detection means that monitors occurrence of any obstacles, and this monitoring result is reflected in status fields in FIGS. 13D to 13F. Obstacles to be detected include the obstacle contents shown in, e.g., FIG. 7. Furthermore, in the monitor process in steps S612, S613, and S616, the print server 101 executes a process for informing the external client computer 104 of the monitoring result of a copy job as in the first embodiment.

Via the processes in steps S623, S612, S624, and S613, a substitution print start process including a specifying process associated with an obstacle source device (detected in step S613) and job is executed in step S1103.

It is checked in step S1103 if an obstacle occurrence message is received from the output apparatus 102. The obstacle occurrence message contains at least output device identification information and job identification information (job ID). Also, the message contains job type identification information used to identify if a job processed upon occurrence of the obstacle is a print job based on PDL, copy job, or FAX job. In FIGS. 13A to 13F, letters "p", "c", and "f" contained in job IDs are used to identify the types of jobs (i.e., a print job, copy job, and FAX job) upon issuance of jobs.

In step S1104, a substitution print job generation process is executed. This process corresponds to a process shown in FIG. 12 (to be described later) that includes a generation process of information shown in FIG. 13C. That is, a registration process of the copy job, whose registration to the transmission queue (output queue) is suppressed (saved) in step S1102, to the print job management information corresponding to a substitution printer based on output job information, and the transmission queue (output queue) is executed.

Figure 12:
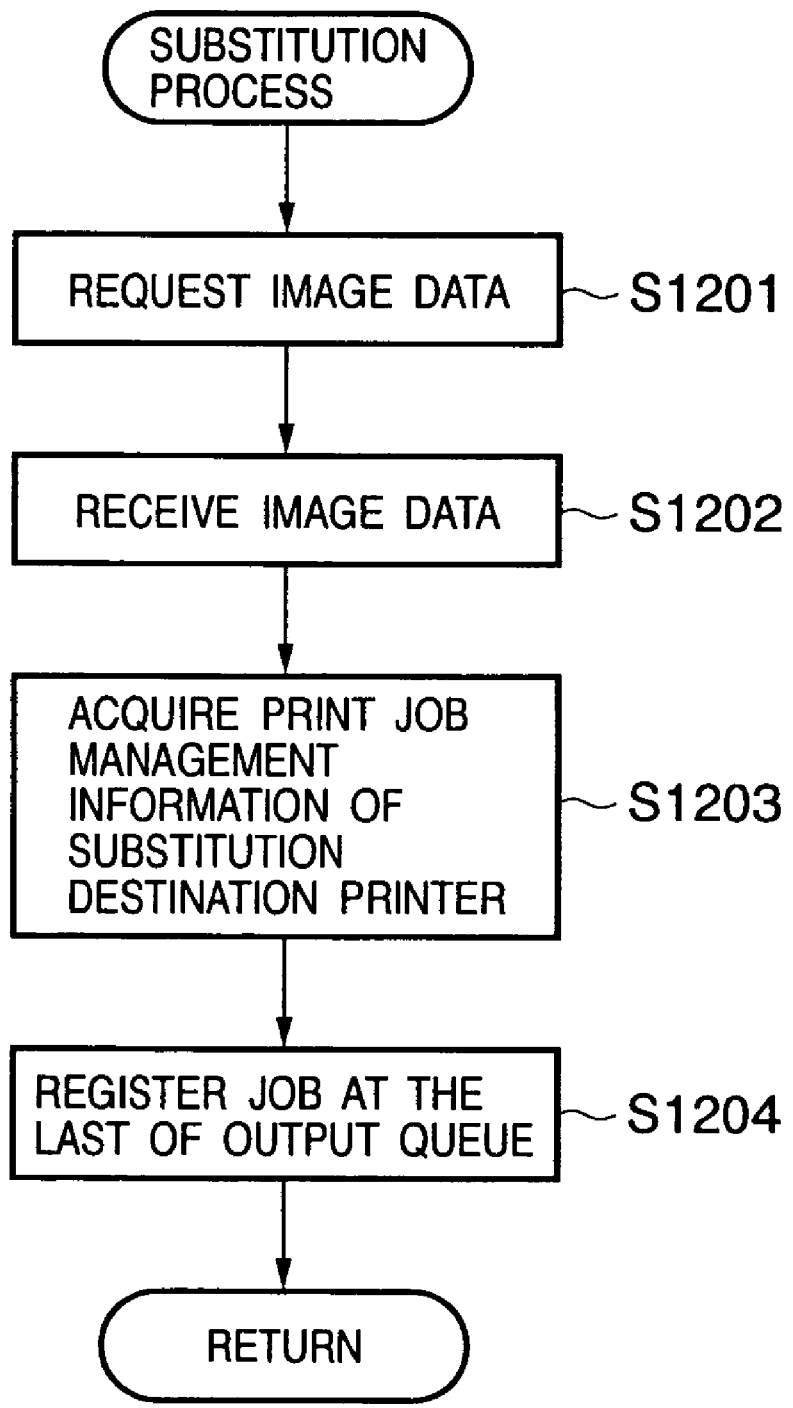
FIG. 12 is a flow chart showing details of a substitution print job generation process executed in the second embodiment.

In job transfer from step S1104 to step S631, a substitution print process is executed on the basis of image data acquired according to the flow chart in FIG. 12, and the setups shown in FIG. 7, which have been explained in the first embodiment. In case of the automatic substitution setup based on the setups shown, in FIG. 7, a substitution job is input to a print apparatus which is set as an automatic substitution destination. The print apparatus in this case may be either a printer which has only a print function of printing externally input print data without any copying or FAX function, or a digital hybrid machine having at least a print function.

FIG. 12 shows details of the substitution print job generation process executed in step S1104 in FIG. 11. In FIG. 12, a case will be explained below wherein an obstacle has occurred in the copying machine 102, and the printer 103 executes a copy job, which is executed in the copying machine 102 at that time, for the copying machine 102. Of course, such substitution process is not limited to only a substitution output from the copying machine 102 to the printer 103.

In step S1201, an image data request is issued to the output apparatus as an obstacle generation message source specified by the process in step S613. Especially, when the output apparatus as the obstacle generation message source is the copying machine 102, and the job type is a copy job, the print server requests the copying machine 102 to send image data of a document scanned in accordance with the process in step S621 in FIG. 6 in the copying machine 102. The image data is as has been explained in the first embodiment. When image data is to be transferred from the copying machine 102 to another print apparatus (e.g., the printer 103) in accordance with an instruction from the print server 101, the processes in steps S1201 and S1202 may be skipped. The processes in steps S1201 and S1202 may be similarly skipped in the first embodiment.

A job processed upon occurrence of the obstacle is specified by searching print job management information (FIG. 13D or 13E) and temporary job management information shown in FIG. 13F for the contents of a message sent from the obstacle occurrence source. The contents of information sent upon occurrence of the obstacle contain at least output device identification information and job identification information (job ID), as has been explained in step S1103 above. Also, that information contains job type identification information used to identify if a job processed upon occurrence of the obstacle is a print job based on PDL, copy job, or FAX job.

Job management information of interest can be specified from FIGS. 13D to 13F using the output device identification information, and a job of interest can be specified using the job identification information (job ID). If the job identification information (job ID) is unique among a plurality of apparatuses, device identification information may be omitted.

In step S1202, print data sent from the output apparatus in response to the request in step S1201 is received. As described above, if the transmission source of print data is the copying machine 102, image data itself of a document scanned according to the process in step S621 in FIG. 6, or data obtained by converting that image data is received.

In step S1203, print job management information of a print apparatus determined as a substitution destination is acquired. As has been described above using FIG. 7, the print apparatus as a substitution destination may be set in advance, or may be dynamically determined by the print server 101 or obstacle occurrence source apparatus based on printer discovery in each substitution process.

In step S1204, a process for reflecting job information (one output job information) of the copy job onto a job output queue of the substitution destination output apparatus is executed. That is, the job information is reflected in such a manner that the information of the copy job in FIG. 13F is registered in the print job management information (FIG. 13E) acquired in step S1203, and that information is registered at the last of the transmission queue (output queue) corresponding to the substitution destination print apparatus.

The copy job in the copying machine 102 indicated by 1319 in FIG. 13F is registered in print job management information of the printer 103, and is reflected in a job indicated by 1307 in the transmission queue (output queue) of the printer 103, as shown in FIG. 13C.

Although not shown, the information indicated by 1319 in FIG. 13F is deleted after the information shown in FIG. 13C is generated. Then, job ID "102job-c0001" indicated by 1307 in FIG. 13C is changed from the copy job to a print job, and that print job is output upon completion of output of print jobs in the order of 1310, 1309, and 1308. In FIG. 13C, the job 1307 uses job ID "102job-c0001" as that for the job 1319 in FIG. 13F without modification, but may be internally changed.

In this way, FIGS. 13A to 13F show the states of the job management information and transmission queue (output queue) which are looked up and updated upon execution of the flow charts shown in FIGS. 11 and 12. Furthermore, in each job management information shown in FIGS. 13D to 13F, print job management information and temporarily registered job management information are distinguished from each other.

FIG. 13A shows the transmission queue (output queue) of print jobs in the copying machine 102.

FIG. 13D shows print job management information based on which the transmission queue shown in FIG. 13A is generated, and this information is generated based on the process in step S1101. The same applies to FIGS. 13E and 13F. The transmission queue (output queue) based on the print job management information is registered when job status in the print job management information has changed to "spooled", and the transmission queue (output queue) is empty. The same applies to FIGS. 13E and 13F. Also, an attribute field in FIG. 13D indicates job attributes such as a job name, job size, resolution, color/monochrome, setups of double-sided print/stapling, image data type, and the like. The same applies to FIGS. 13E and 13F.

FIG. 13B shows the transmission queue (output queue) of print jobs in the printer 103.

FIG. 13E shows the print job management information based on which the transmission queue in FIG. 13B is generated.

FIG. 13F shows the job management information of copy and FAX jobs other than PDL print jobs. In FIG. 13F, this management information is described as temporarily registered job management information.

FIG. 13C shows information of the transmission queue (output queue) generated based on the information 1319 in the temporarily registered job management information in FIG. 13F and the print job management information of the printer 103 in FIG. 13B, when an obstacle has occurred in the copying machine 102, as described above.

Note that FIG. 13F independently describes temporarily registered job management information of copy jobs, and that of FAX jobs. However, these pieces of information may be included in a single table as long as they can be logically identified, or may form independent tables. Also, print job management information and temporarily registered job management information are independently described. However, these pieces of information may be included in a single table as long as they can be logically identified. Furthermore, in FIGS. 13A to 13F, tables of the transmission queue (output queue) and job management information are independently generated. Alternatively, the processes in the flow charts shown in FIGS. 11 and 12 may be executed using only the transmission queues except for the temporarily registered print job information. The same applies to the third and fourth embodiments to be described later.

As described above, according to the second embodiment, print jobs and copy and FAX jobs can be consolidated as well as the substitution print process. Unlike in the conventional mechanism in which print jobs based on PDL are registered in a print system (server), and are registered in a transmission queue and are then output (transmission output and print output), print jobs based on PDL, and copy and FAX jobs are separately managed. Hence, a device can be prevented from any errors caused by a job transmission process or a double-print process after a copy job is registered and a copy output is underway.

Also, jobs including copy, print, and FAX jobs can be scheduled in a print system used in a single network environment.

Since a generated copy job is registered under the management of the server, the job can be appropriately managed even after the substitution process. For example, if a substitution process (transfer of image data) is done from the digital hybrid machine 102 to the printer 103 without any management of the server in FIG. 1, job "103job-p0004" keeps the standby state even after job "103job-p0003" has already been output, and the server recognizes that job "103job-p0004" is standing by due to unknown causes. Also, even when the external client computer monitors the job status of the printer 103 via a job status monitor utility, only a result indicating that "103job-p0004" is standing by due to unknown causes returns, and may cause user's misunderstandings. This embodiment can avoid such situation.

Furthermore, according to the present invention, even jobs generated on the apparatus side can be scheduled by the print server system, and the transmission order of jobs can be scheduled using the same operation and display contents as those of print jobs generated by each client computer.

Third Embodiment

Figure 14:
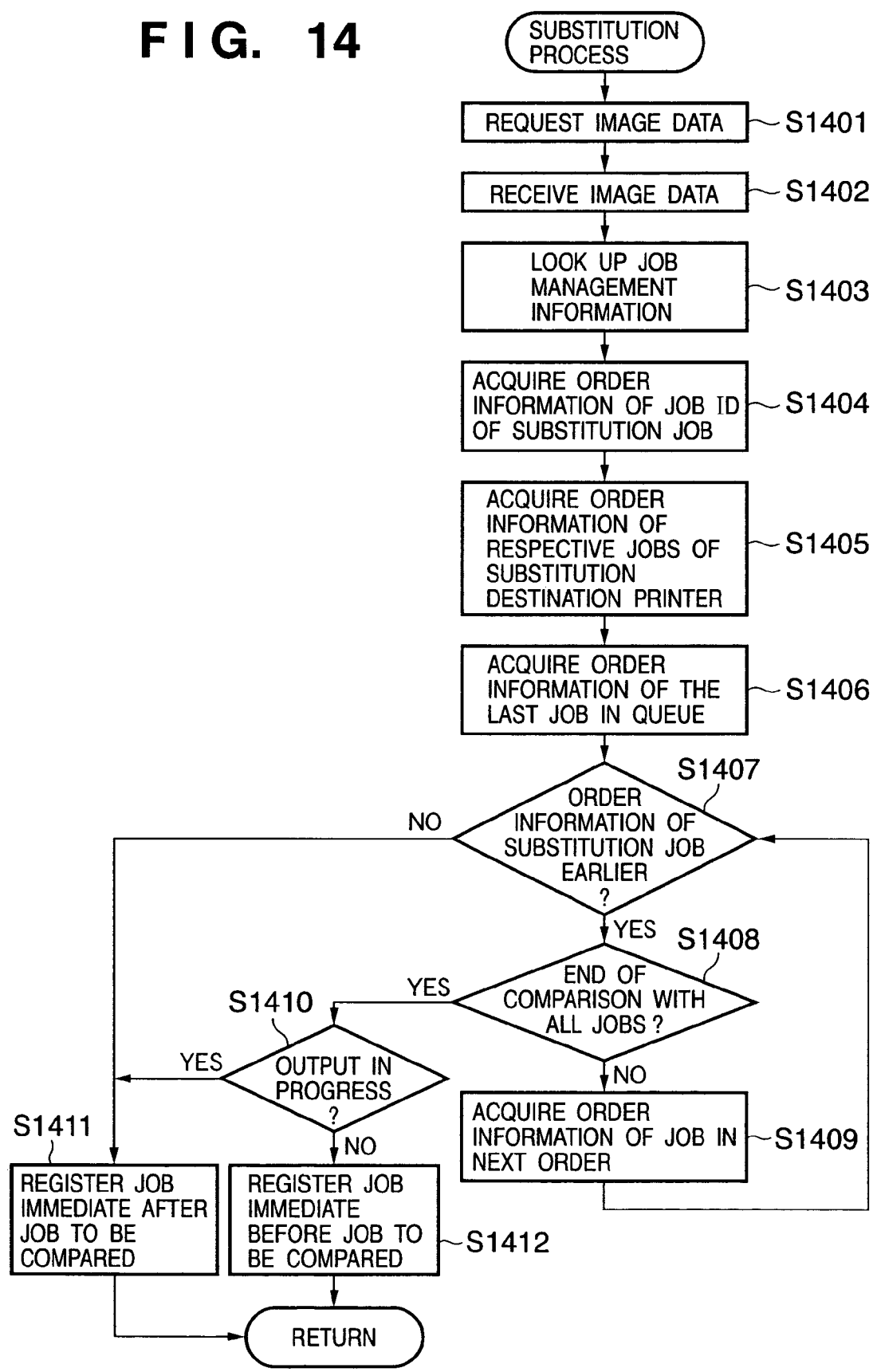
FIG. 14 is a flow chart showing details of a substitution print job generation process executed in the third embodiment.

The third embodiment will explain a modification of the processes executed in steps S1203 and S1204 that have been explained in FIG. 12 of the second embodiment. FIG. 14 to be described below assumes a case wherein an obstacle has occurred in the copying machine 102, and the printer 103 executes a copy job, which is executed in the copying machine 102 at that time, for the copying machine 102, as in the flow chart shown in FIG. 12.

In FIG. 14, the processes in steps S1401 and S1402 are executed first. However, since these processes are the same as those in steps S1201 and S1202 in FIG. 12, a detailed description thereof will be omitted.

In step S1403, job management information (FIG. 13F) of a job processed upon occurrence of the obstacle, and job management information (FIG. 13E) in a print apparatus as a substitution destination are looked up.

In step S1404, order information (that in FIG. 13F) of the job that meets the substitution condition is acquired on the basis of the information looked up in step S1403. Note that the job processed upon occurrence of the obstacle is specified in the same manner as in the second embodiment. In FIGS. 13A to 13F and FIG. 14, as an example of the order information, a time based on registration of job information in the print server 101 upon generation of a job is used. Of course, the order information is not limited to time. For example, a serial number upon registration of job information, which is uniquely specified among a plurality of output apparatuses may be used. In case of a print job, job information may be registered upon completion of spooling of print data in the client computer or print server.

In step S1405, the order information (that in FIG. 13E) of each print job in the substitution destination printer is specified on the basis of the information looked up in step S1403.

In step S1406, the order information of the last job is acquired from those in the job management information of the substitution destination output apparatus acquired in step S1405.

It is checked in step S1407 if the order information acquired in step S1404 is earlier, i.e., has an earlier time and higher priority, than that acquired in step S1406 is earlier.

If NO in step S1407, the substitution job is registered at the last of the output queue in the substitution destination as in the second embodiment (S1411). Note that the latest order information among those in the job management information also applies to the order information in the transmission queue (output queue).

On the other hand, if YES in step S1407, it is checked in step S1408 if the comparison process in step S1407 has been done for all jobs of the substitution destination printer. If NO in step S1408, the order information of a job in the next order of the job management information of the substitution destination printer is acquired to repeat the process in step S1407.

If YES in step S1408, it is determined in step S1410 on the basis of status in the print job information or transmission queue (output queue) whether or not output (transmission) of the print job to be compared in the substitution destination is in progress. If YES In step S1410, the aforementioned process in step S1411 is executed.

On the other hand, if NO in step S1410, the substitution job is registered in the job management information and transmission queue (output queue) to be inserted immediately before the current job to be compared in step S1407 in the substitution destination output apparatus. As a result of the process in step S1412, the job management information and transmission queue (output queue) of the substitution destination printer 103 are updated on the basis of the order information contained in the job information of the copy job of the copying machine 102, and that contained in the job information already registered in the substitution destination printer 103.

FIGS. 15A to 15D show the information of the job management information and transmission queues (output queues) updated in accordance with the flow chart of FIG. 14. FIGS. 15B and 15D show differences from corresponding ones of FIGS. 13A to 13F. Although not shown in FIGS. 15A to 15D, FIGS. 13A, 13D, and 13F are included, and FIGS. 15A and 15C respectively correspond to FIGS. 13B and 13E.

In FIG. 15B, a field 1507 indicates a state wherein the transmission queue (output queue) of the substitution destination printer 103 is updated on the basis of the order information contained in the job management information of the copy job in the copying machine 102 as a substitution source. The generation process of FIG. 15B corresponds to the aforementioned process executed via YES in step S1410. Also, FIG. 15D shows a state wherein the job management information of the printer 103 is updated.

Since jobs are output on the basis of the job management information and transmission queue (output queue), as shown in FIGS. 15B and 15D, a substitution output that gives priority on the issuance timing of a job can be realized, and a substitution output system equitable to users can be provided.

In the above description, the order information in the job management information of the copy job is compared with that contained in the job management information of the substitution destination output apparatus. Alternatively, the order information in the lob management information of the copy job may be compared with that of the transmission queue (output queue) of the substitution destination output apparatus.

As described above, according to the third embodiment, since the copy job is registered together with its order information (e.g., time information), the registration process to the job management information and transmission queue (output queue) in the substitution destination can be appropriately made on the basis of the order information upon occurrence of an obstacle of the copy job. Hence, for a copy job holder, since the substitution order control is made in the substitution destination print apparatus on the basis of the start time of the copy job, a job end time close to that without any substitution process can be assured.

For example, a situation that many jobs are registered in the substitution destination print apparatuses after the start of a copy job, and the user must wait until such many jobs are output after generation of the substitution process, can be avoided.

Since image data of the copy job is stored in the server only when the substitution process is generated, a reception process of the image data need only be made only when it is required, thus reducing the network load.

Fourth Embodiment

In the first to third embodiments, print data is spooled in the print server 101. However, the present invention is not limited to this, and another embodiment may be assumed.

For example, in case of a print job, print data may be spooled in the client computer, and the client computer may transmit a job to the printer in response to an output instruction based on an output queue in the print server 101. On the other hand, in case of a copy or FAX job, image data may be spooled in the copying machine 102, and a job may be transferred from the copying machine 102 to a substitution destination output apparatus (printer 103) without going through the print server in response to an output instruction based on the output queue in the print server 101.

Even when such job transfer mode is adopted, the job management information is managed as in the first to third embodiments.

The transmission queue described in the first to third embodiments may correspond to a print queue in a print apparatus main body, and the aforementioned flow charts may be executed using such print queue.

Other Embodiment

The present invention may be applied to either a system constituted by a plurality of devices, or an apparatus consisting of a single equipment.

Note that the present invention includes a case wherein the invention is achieved by directly or remotely supplying software programs (programs corresponding to the sequence charts and flow charts shown in FIGS. 6, 8, 9, 10, 11, 12, and 14) that implement the functions of the aforementioned embodiments to a system or apparatus, and reading out and executing the supplied program codes by a computer of that system or apparatus. In this case, the form is not limited to a program as long as it has functions of the program.

Therefore, the program code itself installed in a computer to implement the functional process of the present invention using the computer implements the present invention. That is, the appended claims of the present invention include the computer program itself for implementing the functional process of the present invention.

In this case, the form of program is not particularly limited, and an object code, a program to be executed by an interpreter, script data to be supplied to an OS, and the like may be used as along as they have the program function.

As a recording medium for supplying the program, for example, a floppy disk, hard disk, optical disk, magneto optical disk, MO, CD-ROM, CD-R, CD-RW, magnetic tape, nonvolatile memory card, ROM, DVD (DVD-ROM, DVD-R) and the like may be used.

As another program supply method, the program may be supplied by establishing connection to a home page on the Internet using a browser on a client computer, and downloading the computer program itself of the present invention or a compressed file containing an automatic installation function from the home page onto a recording medium such as a hard disk or the like. Also, the program code that forms the program of the present invention may be segmented into a plurality of files, which may be downloaded from different home pages. That is, the appended claims of the present invention include a WWW server which makes a plurality of users download a program file required to implement the functional process of the present invention by the computer.

Also, a storage medium such as a CD-ROM or the like, which stores the encrypted program of the present invention, may be delivered to the user, a user who has cleared a predetermined condition may be allowed to download key information that is used to decrypt the program from a home page via the Internet, and the encrypted program may be executed using that key information to be installed on a computer, thus implementing the present invention.

The functions of the aforementioned embodiments may be implemented not only by executing the readout program code by the computer but also by some or all of actual processing operations executed by an OS or the like running on the computer on the basis of an instruction of that program.

Furthermore, the functions of the aforementioned embodiments may be implemented by some or all of actual processes executed by a CPU or the like arranged in a function extension board or a function extension unit, which is inserted in or connected to the computer, after the program read out from the recording medium is written in a memory of the extension board or unit.

As many apparently widely different embodiments of the present invention can be made without departing from the spirit and scope thereof, it is to be understood that the invention is not limited to the specific embodiments thereof except as defined in the claims.

What is claimed is:

1. An output management method for an information processing apparatus, which can communicate with a first output apparatus having a copying function of printing based on a scanned document image, and a second output apparatus having a print function of printing image data transmitted from an external device in a predetermined format, and comprises a server function of managing output jobs in the first and second output apparatuses, comprising:

a first acquisition step of acquiring first output job information of a copy job to be executed by the first output apparatus before an occurrence of any obstacle that disturbs execution of a copy job;

a detection step of detecting the occurrence of any obstacle that disturbs execution of a copy job during execution of a copy job in the first output apparatus;

a substitution output step of controlling the second output apparatus to execute a substitution print process based on the first output job information upon detection of occurrence of the obstacle during execution of the copy job in the first output apparatus in the detection step; and an updating step of reflecting the first output job information onto a second job output queue of the second output apparatus, wherein the substitution output step includes a step of transmitting a job on the basis of the second job output queue updated in the updating step.

2. The method according to claim 1, wherein the detection step includes a step of monitoring occurrence of an obstacle by monitoring based on the first output job information, and said method further comprises a notification step of notifying an external client computer of a monitoring result based on monitoring in the detection step.

3. The method according to claim 1, wherein the first output job information contains first order information, and the update step includes a step of updating the second job output queue on the basis of the first order information, and second order information of a job in the second output apparatus.

4. The method according to claim 1, further comprising a suppression step of suppressing registration of the copy job acquired in the first acquisition step in a job output queue on the basis of the first output job information, and wherein the update step includes a step of executing a registration process of the copy job to the second job output queue based on the first output job information in the detection step.

5. The method according to claim 1, wherein the first output job information contains management information used to manage the output job and/or image data to be output.

6. The method according to claim 1, wherein the substitution output step includes a conversion step of converting a format of image data based on the first output job information into a format that the second output apparatus can process.

7. The method according to claim 1, further comprising a substitution determination step of determining in accordance with setup information set by a user in advance whether or not a substitution process is to be executed for each output job type.

8. The method according to claim 7, wherein the setup information contains information of an obstacle that may occur for each output job type, and execution/non-execution of a substitution process upon occurrence of that obstacle.

9. An information processing apparatus, which can communicate with a first output apparatus having a copying function of printing based on a scanned document image, and a second output apparatus having a print function of printing image data transmitted from an external device in a predetermined format, and comprises a server function of managing output jobs in the first and second output apparatuses, comprising:

first acquisition means for acquiring first output job information of a copy job to be executed by the first output apparatus before an occurrence of any obstacle that disturbs execution of a copy job;

detection means for detecting occurrence of any obstacle that disturbs execution of a copy job during execution of a copy job in the first output apparatus;

substitution output means for controlling the second output apparatus to execute a substitution print process based on the first output job information upon detection of occurrence of the obstacle during execution of the copy job in the first output apparatus by said detection means; and updating means for reflecting the first output job information onto a second job output queue of the second output apparatus, wherein the substitution output means includes transmitting means for transmitting a job on the basis of the second job output queue updated by the updating means.

10. The apparatus according to claim 9, wherein said detection means monitors occurrence of an obstacle by monitoring based on the first output job information, and said apparatus further comprises notification means for notifying an external client computer of a monitoring result based on monitoring of said detection means.

11. The apparatus according to claim 9, wherein the first output job information contains first order information, and said update means updates the second job output queue on the basis of the first order information, and second order information of a job in the second output apparatus.

12. The apparatus according to claim 9, further comprising suppression means for suppressing registration of the copy job acquired by said first acquisition means in a job output queue on the basis of the first output job information, and wherein said update means executes a registration process of the copy job to the second job output queue based on the first output job information by said detection means.

13. The apparatus according to claim 9, wherein the first output job information contains management information used to manage the output job and/or image data to be output.

14. The apparatus according to claim 9, wherein said substitution output means converts a format of image data based on the first output job information into a format that the second output apparatus can process.

15. The apparatus according to claim 9, further comprising determination means for determining in accordance with setup information set by a user in advance whether or not a substitution process is to be executed for each output job type, and wherein the substitution process of said substitution output means is executed based on a determination result of said determination means.

16. The apparatus according to claim 15, wherein the setup information contains information of an obstacle that may occur for each output job type, and execution/non-execution of a substitution process upon occurrence of that obstacle.

17. A computer-executable program stored on a computer-readable storage medium which comprises program codes for making an information processing apparatus, which can communicate with a first output apparatus having a copying function of printing based on a scanned document image, and a second output apparatus having a print function of printing image data transmitted from an external device in a predetermined format, and comprises a server function of managing output jobs in the first and second output apparatuses, execute:

a first acquisition step of acquiring first output job information of a copy job to be executed by the first output apparatus before an occurrence of any obstacle that disturbs execution of a copy job;

a detection step of detecting occurrence of any obstacle that disturbs execution of a copy job during execution of a copy job in the first output apparatus;

a substitution output step of controlling the second output apparatus to execute a substitution print process based on the first output job information upon detection of occurrence of the obstacle during execution of the copy job in the first output apparatus in the detection step; and an updating step of reflecting the first output job information onto a second job otuput queue of the second output apparatus, wherein the substitution output step includes a step of transmitting a job on the basis of the second job output queue updated in the updating step.

18. A computer-readable storage medium storing a computer-executable program which comprises program codes for making an information processing apparatus, which can communicate with a first output apparatus having a copying function of printing based on a scanned document image, and a second output apparatus having a print function of printing image data transmitted from an external device in a predetermined format, and comprises a server function of managing output jobs in the first and second output apparatuses, execute:

a first acquisition step of acquiring first output job information of a copy job to be executed by the first output apparatus before an occurrence of any obstacle that disturbs execution of a copy job;

a detection step of detecting occurrence of any obstacle that disturbs execution of a copy job during execution of a copy job in the first output apparatus;

a substitution output step of controlling the second output apparatus to execute a substitution print process based on the first output job information upon detection of occurrence of the obstacle during execution of the copy job in the first output apparatus in the detection step; and an updating step of reflecting the first output job information onto a second job output queue of the second output apparatus, wherein the substitution output step includes a step of transmitting a job on the basis of the second job output queue updated in the updating step.

* * * * *

UNITED STATES PATENT AND TRADEMARK OFFICE
CERTIFICATE OF CORRECTION

| | |
|---|---|
| PATENT NO. | : 7,362,456 B2 |
| APPLICATION NO. | : 10/632972 |
| DATED | : April 22, 2008 |
| INVENTOR(S) | : Wanda |

It is certified that error appears in the above-identified patent and that said Letters Patent is hereby corrected as shown below:

<u>On the title page, item [56]</u>:
    Foreign Patent Documents, "07225660 A" should read -- 7-225660 A --; and "09081338 A" should read -- 9-081338 A --.

<u>COLUMN 1</u>:
    Line 59, "print" should read -- a print --.

<u>COLUMN 3</u>:
    Line 41, "include" should read -- includes --.

<u>COLUMN 4</u>:
    Line 27, "achieved" should read -- be achieved --.

<u>COLUMN 7</u>:
    Line 5, "images," should read -- image, --;
    Line 13, "inc.," should read -- Inc., --;
    Line 14, "Canon Inc.," should read -- Canon, Inc., --; and
    Line 60, "print server 011" should read -- print server 101 --.

<u>COLUMN 13</u>:
    Line 64, "shown," should read -- shown --.

<u>COLUMN 14</u>:
    Line 5, "executed-in" should read -- executed in --.

<u>COLUMN 17</u>:
    Line 13, "is earlier" should be deleted; and
    Line 31, "YES In" should read -- YES in --.

UNITED STATES PATENT AND TRADEMARK OFFICE
CERTIFICATE OF CORRECTION

PATENT NO. : 7,362,456 B2
APPLICATION NO. : 10/632972
DATED : April 22, 2008
INVENTOR(S) : Wanda It is certified that error appears in the above-identified patent and that said Letters Patent is hereby corrected as shown below:

<u>COLUMN 18</u>:
      Line 5, "lob" should read -- job --;
      Line 35, "case" should read -- the case --; and
      Line 39, "case" should read -- the case --.

<u>COLUMN 19</u>:
      Line 10, "along" should read -- long --.

Signed and Sealed this

Twenty-eighth Day of October, 2008

JON W. DUDAS
*Director of the United States Patent and Trademark Office*